(12) United States Patent
Li et al.

(10) Patent No.: US 11,240,820 B2
(45) Date of Patent: Feb. 1, 2022

(54) REFERENCE SIGNAL TRANSMISSION METHOD, MESSAGE TRANSMISSION METHOD, TRANSMISSION RESOURCE DETERMINING METHOD, AND APPARATUS

(71) Applicant: HUAWEI TECHNOLOGIES CO., LTD., Guangdong (CN)

(72) Inventors: Chao Li, Beijing (CN); Xingwei Zhang, Lund (SE); Yinghua Sun, Shenzhen (CN); Guanglong Du, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/713,700

(22) Filed: Dec. 13, 2019

(65) Prior Publication Data

US 2020/0120682 A1   Apr. 16, 2020

Related U.S. Application Data

(63) Continuation of application No. PCT/CN2018/091339, filed on Jun. 14, 2018.

(30) Foreign Application Priority Data

Jun. 15, 2017   (CN) .......................... 201710453411.X

(51) Int. Cl.
*H04W 72/04* (2009.01)
*H04L 1/18* (2006.01)
(Continued)

(52) U.S. Cl.
CPC ....... *H04W 72/0493* (2013.01); *H04L 1/1812* (2013.01); *H04L 5/0051* (2013.01); *H04L 25/0226* (2013.01); *H04W 72/0446* (2013.01)

(58) Field of Classification Search
CPC .......... H04W 72/0493; H04W 72/0446; H04L 1/1812; H04L 5/0051; H04L 25/0226
See application file for complete search history.

(56) References Cited

U.S. PATENT DOCUMENTS 10,419,175 B2*  9/2019  Kim ...................... H04W 16/10
2007/0104151 A1  5/2007  Papasakellariou et al.
(Continued)

FOREIGN PATENT DOCUMENTS

CN   101541029 A   9/2009
CN   102404854 A   4/2012
(Continued)

OTHER PUBLICATIONS

3GPP TS 38.211 V0.0.0 (May 2017), "3rd Generation Partnership Project; Technical Specification Group Radio Access Network; NR; Physical channels and modulation (Release 15)," May 2017, 10 pages.
(Continued)

*Primary Examiner* — Wei Zhao
(74) *Attorney, Agent, or Firm* — Fish & Richardson P.C.

(57) ABSTRACT

Embodiments of this application disclose a reference signal transmission method, a message transmission method, a transmission resource determining method, and an apparatus. When a first device needs to transmit a reference signal, the first device may determine, from a slot and based on a time domain resource parameter of the reference signal, transmission resource information related to a transmission resource used to transmit the reference signal, where the transmission resource information may include a symbol location of the transmission resource in the slot and/or a space domain resource on a symbol in the transmission resource. Compared with a conventional manner in which a reference signal can be transmitted only at a fixed location, the transmission resource for transmitting the reference (Continued)

signal can be dynamically determined based on the time domain resource parameter of the reference signal.

20 Claims, 11 Drawing Sheets

(51) Int. Cl.
*H04L 5/00* (2006.01)
*H04L 25/02* (2006.01)

(56) References Cited

U.S. PATENT DOCUMENTS

| | | | |
|---|---|---|---|
| 2013/0195084 | A1 | 8/2013 | Chen et al. |
| 2013/0294318 | A1* | 11/2013 | Amerga ............... H04W 4/06 370/312 |
| 2014/0029428 | A1 | 1/2014 | Lin et al. |
| 2016/0119936 | A1 | 4/2016 | Kim et al. |
| 2016/0135147 | A1 | 5/2016 | Ouchi et al. |
| 2017/0064558 | A1* | 3/2017 | Li ....................... H04L 5/005 |

FOREIGN PATENT DOCUMENTS

| | | |
|---|---|---|
| CN | 102761911 A | 10/2012 |
| CN | 103944665 A | 7/2014 |
| CN | 104081708 A | 10/2014 |
| CN | 105308889 A | 2/2016 |
| CN | 106254047 A | 12/2016 |
| JP | 2014504816 A | 2/2014 |
| JP | 2015508630 A | 3/2015 |
| KR | 20140125819 A | 10/2014 |

OTHER PUBLICATIONS

3GPP TS 38.331 V0.0.3 (May 2017), "3rd Generation Partnership Project; Technical Specification Group Radio Access Network; NR; Radio Resource Control (RRC); Protocol specification (Release 15)," May 2017, 20 pages.
Guangdong OPPO Mobile Telecom, "On SRS design for NR," 3GPP TSG RAN WG1 Meeting #89, R1-1707701, Hangzhou, China, May 15-19, 2017, 4 pages.
Huawei, HiSilicon, "UL SRS design for beam management, CSI acquisition," 3GPP TSG RAN WG1 Meeting #89, R1-1706938; Hangzhou, China, May 15-19, 2017, 9 pages.
Office Action issued in Chinese Application No. 201710453411.X dated Mar. 4, 2020, 13 pages (with English translation).
PCT International Search Report and Written Opinion issued in International Application No. PCT/CN2018/091339 dated Aug. 30, 2018, 16 pages (with English translation).
Office Action issued in Chinese Application No. 201710453411.X dated Oct. 21, 2020, 6 pages.
Sony, "Discussion on triggering resource reselection based on collision detection," 3GPP TSG RAN WG1 Meeting #86, R1-167076, Gothenburg, Sweden, Aug. 22-26, 2016, 5 pages.
ZTE, "Collision handling for NB-IoT," 3GPP TSG RAN WG1 Meeting #84bis, R1-162760, Busan, Korea, Apr. 11-15, 2016, 3 pages.
Extended European Search Report issued in European Application No. 18817482.5 dated Jun. 29, 2020, 8 pages.
Nokia Siemens Networks, "Remaining Issues on Multiple Timing Advance," 3GPP TSG-RAN WG1 Meeting #70bis, R1-124177, San Diego, USA, Oct. 8-12, 2012, 3 pages.
Office Action issued in Chinese Application No. 201880040166.2 dated Jul. 3, 2020, 11 pages (with English translation).
Intel Corporation, "Consideration on Support SRS Carrier based Switching," 3GPP TSG-RAN WG1 #85, R1-164157, Nanjing, China, May 23-27, 2016, 4 pages.
Office Action issued in Japanese Application No. 2019-569761 dated Jan. 26, 2021, 12 pages (with English translation).
3GPP TS 36.213 V12.7.0 (Sep. 2015), "3rd Generation Partnership Project; Technical Specification Group Radio Access Network; Evolved Universal Terrestrial Radio Access (E-UTRA); Physical layer procedures (Release 12)," Sep. 2015, 163 pages.
LG Electronics, "Discussion on UL channel multiplexing in NR," 3GPP TSG RAN WG1 Meeting #88bis, R1-1704912, Spokane, USA, Apr. 3-7, 2017, 6 pages.
Office Action issued in Korean Application No. 2020-7001165 dated Apr. 22, 2021, 8 pages (with English translation).
Office Action issued in Chinese Application No. 201880040166.2 dated Mar. 18, 2021,12 pages (with English translation).
Alcatel-Lucent et al., "Simultaneous transmissions of multiple UL channels with multiple TA groups," 3GPP TSG RAN WG1 Meeting #69, R1-122473, Prague, Czech Republic, May 21-25, 2012, 4 pages.
Huawei, HiSilicon, "Multiplexing of UL control channel and SRS in NR," 3GPP TSG RAN WG1 Meeting #88bis, R1-1704210, Spokane, USA, Apr. 3-7, 2017, 3 pages.
Office Action issued in Korean Application No. 2020-7001165 dated Oct. 19, 2021, 4 pages (with English translation).

\* cited by examiner

REFERENCE SIGNAL TRANSMISSION METHOD, MESSAGE TRANSMISSION METHOD, TRANSMISSION RESOURCE DETERMINING METHOD, AND APPARATUS

CROSS-REFERENCE TO RELATED APPLICATIONS

The present invention is a continuation of International Application No. PCT/CN2018/091339, filed on Jun. 14, 2018, which claims priority to Chinese Patent Application No. 201710453411.X, filed on Jun. 15, 2017. The disclosures of the aforementioned applications are hereby incorporated by reference in their entireties.

TECHNICAL FIELD

This application relates to the communications field, and in particular, to a reference signal transmission method, a message transmission method, a transmission resource determining method, and a related apparatus.

BACKGROUND

With development of communications technologies, an increasingly high requirement is posed on transmission performance of a device in the communications field.

For different communication requirements, various types of reference signals need to be transmitted between devices. For example, when a device is terminal equipment (TE), to implement measurement of an uplink channel, the TE needs to send a channel sounding reference signal (SRS); to implement demodulation of uplink data, the TE needs to send a demodulation reference signal (DMRS); to perform uplink access, the TE needs to send a random access reference signal; and to measure phase noise within transmission bandwidth, the TE needs to send a phase tracking reference signal.

However, in a conventional manner, a location of a transmission resource used to transmit a reference signal is fixed. Therefore, a transmission resource used by a device to send a reference signal may collide with a transmission resource used by the device to send another message. This causes adverse impact on transmission performance of the device, or even causes a demodulation or decoding error in a severe case, affecting normal transmission of the device.

SUMMARY

Embodiments of this application provide a reference signal transmission method, a message transmission method, a transmission resource determining method, and a related apparatus, to reduce a probability of colliding with sending of another message during sending of a reference signal, thereby improving system transmission efficiency.

According to a first aspect, an embodiment of this application provides a reference signal transmission method. The method is applied to a first device, and the method includes: obtaining a time domain resource parameter used to send a reference signal; determining, from a slot and based on the time domain resource parameter, information about a transmission resource used to transmit the reference signal, where the transmission resource information includes a symbol location of the transmission resource in the slot and/or a space domain resource on a symbol in the transmission resource; and sending the reference signal on the transmission resource.

Optionally, the reference signal includes an SRS.

Optionally, the space domain resource includes a beam direction of a beam used to transmit the reference signal, or a precoding parameter for use when the reference signal is transmitted by using a plurality of antennas.

Optionally, the time domain resource parameter includes a type of a slot used to send the reference signal and/or an index of a time domain resource for sending the reference signal.

Optionally, the type of the slot is determined based on a function of the slot and/or a quantity of transmitting resources and a quantity of receiving resources in the slot.

Optionally, the determining, from a slot and based on the time domain resource parameter, information about a transmission resource used to transmit the reference signal includes: determining, from the slot and based on the time domain resource parameter and a first parameter, the information about the transmission resource used to transmit the reference signal, where the first parameter includes any one of or a combination of more than one of a carrier identifier, a bandwidth part identifier, a cell identifier, a beam identifier, and a subcarrier spacing.

Optionally, the determining, from a slot and based on the time domain resource parameter, information about a transmission resource used to transmit the reference signal includes: determining, based on a slot type of the slot, the symbol location, in the slot, of the transmission resource used to transmit the reference signal, where each slot type is associated with a symbol location that is of the reference signal in the slot and that corresponds to the slot type; or determining, based on a slot type of the slot, the symbol location, in the slot, of the transmission resource used to transmit the reference signal and a quantity of symbols, where each slot type is associated with a quantity of symbols and a symbol location that is of the reference signal in the slot and that corresponds to the slot type.

Optionally, the transmission resource includes at least one symbol. When the transmission resource includes a plurality of symbols, the plurality of symbols are consecutive symbols in time domain or nonconsecutive symbols in time domain.

Optionally, the determining, from a slot and based on the time domain resource parameter, information about a transmission resource used to transmit the reference signal includes: determining, from one slot or a plurality of consecutive slots and based on the time domain resource parameter, the information about the transmission resource used to transmit the reference signal.

Optionally, the determining, from a slot and based on the time domain resource parameter, information about a transmission resource used to transmit the reference signal includes: determining, from a transmission resource set of the slot and based on the time domain resource parameter, the information about the transmission resource used to transmit the reference signal, where the transmission resource set is predefined, or configured by using signaling.

Optionally, the transmission resource set includes M symbols in one or more slots, and a quantity of symbols included in the transmission resource is N, where M≥N.

Optionally, the determining, from a transmission resource set of the slot and based on the time domain resource parameter, the information about the transmission resource used to transmit the reference signal includes: determining, from the transmission resource set of the slot and based on the time domain resource parameter and a first parameter, the information about the transmission resource used to transmit the reference signal, where the first parameter includes any one of or a combination of more than one of a carrier identifier, a bandwidth part identifier, a cell identifier, a beam identifier, and a subcarrier spacing.

Optionally, the first device has M antenna ports, the space domain resource on the symbol in the transmission resource includes an antenna port identifier, the time domain resource parameter includes an index of a time domain resource for sending the reference signal, and the determining, from a slot and based on the time domain resource parameter, information about a transmission resource used to transmit the reference signal includes: determining, by the first device from the slot and based on the index of the time domain resource for sending the reference signal, identifiers of K antenna ports used to transmit the reference signal, where K is a positive integer greater than 1, and the identifiers of the K antenna ports correspond to the K antenna ports in the M antenna ports.

Optionally, the determining, from the slot and based on the index of the time domain resource for sending the reference signal, identifiers of K antenna ports used to transmit the reference signal includes: determining, by the first device from the slot and based on an offset parameter and the index of the time domain resource for sending the reference signal, the identifiers of the K antenna ports used to transmit the reference signal.

Optionally, the determining, from a slot and based on the time domain resource parameter, information about a transmission resource used to transmit the reference signal includes: determining, from the slot and based on the time domain resource parameter and a predefined mode, a beam direction of each symbol in the transmission resource used to transmit the reference signal.

Optionally, the transmission resource for transmitting the reference signal includes N symbols, where N is a positive integer greater than 1, at least two of the N symbols occupy a same frequency domain resource of the reference signal, and the reference signal is generated by multiplying an orthogonal sequence whose length is N by a reference signal sequence whose length is L.

According to a second aspect, an embodiment of this application provides a reference signal transmission apparatus. The apparatus may be a network device or a terminal device, or may be a chip inside a network device or inside a terminal device. The apparatus may include a processing unit and a transceiver unit. When the apparatus is a network device or a terminal device, the processing unit may be a processor, and the transceiver unit may be a transceiver; the network device or the terminal device may further include a storage unit, where the storage unit may be a memory; and the storage unit is configured to store an instruction, and the processing unit executes the instruction stored in the storage unit, so that the network device or the terminal device performs the method according to the first aspect. When the apparatus is a chip inside a network device or inside a terminal device, the processing unit may be a processor, and the transceiver unit may be an input/output interface, a pin, a circuit, or the like; and the processing unit executes an instruction stored in a storage unit, so that the network device or the terminal device performs the method according to the first aspect, where the storage unit may be a storage unit (for example, a register or a cache) in the chip, or may be a storage unit (for example, a read-only memory or a random access memory) located inside the network device or the terminal device but outside the chip.

According to a third aspect, an embodiment of this application provides a method for determining a transmission resource of a reference signal. The method is applied to a first device, and the method includes: determining a first resource and a second resource, where the first resource is a transmission resource used to transmit a to-be-sent reference signal, and the second resource is a transmission resource used to transmit a to-be-sent message; determining an overlapping portion, where the overlapping portion includes a time domain portion that is in the first resource and that overlaps with the second resource; and determining, from the overlapping portion, a transmission resource used to transmit a part of the reference signal, or determining that all transmission resources in the overlapping portion are transmission resources not used to transmit the reference signal.

Optionally, a transmission resource in the first resource includes any one of or a combination of more than one of a time domain resource, a frequency domain resource, a code domain resource, and a space domain resource.

Optionally, a case, in which the first resource has a portion that overlaps with the second resource, includes any one of the following: some symbols of the first resource overlap with some symbols of the second resource in terms of time domain locations; or all symbols of the first resource overlap with some symbols of the second resource in terms of time domain locations; or some symbols of the first resource overlap with all symbols of the second resource in terms of time domain locations; or all symbols of the first resource overlap with all symbols of the second resource in terms of time domain locations.

Optionally, the determining, from the overlapping portion, a transmission resource used to transmit a part of the reference signal, or determining that all transmission resources in the overlapping portion are transmission resources not used to transmit the reference signal includes: determining, from the first resource, a transmission resource used to transmit a part of the reference signal, or determining that all the transmission resources in the overlapping portion are transmission resources not used to transmit the reference signal, or determining that all transmission resources in the first resource are transmission resources not used to transmit the reference signal.

Optionally, if some symbols of the first resource overlap with some symbols of the second resource in terms of time domain locations or if some symbols of the first resource overlap with all symbols of the second resource in terms of time domain locations, a transmission resource used to transmit a part of the reference signal is determined from the first resource, or it is determined that all the transmission resources in the first resource are transmission resources not used to transmit the reference signal.

Optionally, the determining, from the overlapping portion, a transmission resource used to transmit a part of the reference signal, or determining that all transmission resources in the overlapping portion are transmission resources not used to transmit the reference signal includes: determining, from the overlapping portion and based on indication information, a transmission resource used to transmit a part of the reference signal, or determining that all the transmission resources in the overlapping portion are transmission resources not used to transmit the reference signal, where the indication information is predefined, or configured by using signaling.

Optionally, the indication information is used to instruct to determine, from the overlapping portion, a transmission resource used to transmit a part of the reference signal; or the indication information is used to instruct to determine that all the transmission resources in the overlapping portion are transmission resources not used to transmit the reference signal; or the indication information is used to instruct to determine that all the transmission resources in the first resource are transmission resources not used to transmit the reference signal.

Optionally, the determining, from the overlapping portion, a transmission resource used to transmit a part of the reference signal, or determining that all transmission resources in the overlapping portion are transmission resources not used to transmit the reference signal includes: determining, from the overlapping portion and based on a quantity of symbols included in the overlapping portion, a transmission resource used to transmit a part of the reference signal, or determining that all the transmission resources in the overlapping portion are transmission resources not used to transmit the reference signal, or determining that all the transmission resources in the first resource are transmission resources not used to transmit the reference signal.

Optionally, the determining, from the overlapping portion and based on a quantity of symbols included in the overlapping portion, a transmission resource used to transmit a part of the reference signal, or determining that all the transmission resources in the overlapping portion are transmission resources not used to transmit the reference signal includes: if the quantity of symbols included in the overlapping portion is less than or equal to a preset quantity, determining, from the overlapping portion, a transmission resource used to transmit a part of the reference signal, or determining that all the transmission resources in the overlapping portion are transmission resources not used to transmit the reference signal; or if the quantity of symbols included in the overlapping portion is greater than the preset quantity, determining that all the transmission resources in the first resource are transmission resources not used to transmit the reference signal.

Optionally, the message includes one or more of a hybrid automatic repeat request HARQ response message, scheduling request SR information, beam failure request information, and the like.

Optionally, the transmission resource used to transmit a part of the reference signal is predefined, or configured by using signaling.

Optionally, the determining, from the overlapping portion, a transmission resource used to transmit a part of the reference signal, or determining that all transmission resources in the overlapping portion are transmission resources not used to transmit the reference signal includes: determining, from the overlapping portion, some space domain resources used to transmit a part of the reference signal, or determining that all space domain resources in the overlapping portion are space domain resources not used to transmit the reference signal.

Optionally, the space domain resource includes a beam direction of a beam used to transmit the reference signal, or a precoding parameter for use when the reference signal is transmitted by using a plurality of antennas.

Optionally, in some space domain resources used to transmit a part of the reference signal, an unsent beam direction of the reference signal located on a first symbol is the same as or different from an unsent beam direction of the reference signal located on a second symbol, where the first symbol and the second symbol are symbols in the overlapping portion.

Optionally, in a partial space domain resource, all of which is used to transmit the reference signal, in the first resource, an unsent beam direction of the reference signal located on a third symbol is the same as or different from an unsent beam direction of the reference signal located on a fourth symbol, where the third symbol and the fourth symbol are symbols in the first resource.

Optionally, after the determining, from the overlapping portion, a transmission resource used to transmit a part of the reference signal, or determining that all transmission resources in the overlapping portion are transmission resources not used to transmit the reference signal, the method further includes: sending indication information to a base station, where the indication information is used to indicate the determined transmission resource used to transmit a part of the reference signal in the overlapping portion; or used to indicate that all the transmission resources in the overlapping portion are transmission resources not used to transmit the reference signal; or used to indicate that all the transmission resources in the first resource are transmission resources not used to transmit the reference signal.

Optionally, the method further includes: sending, by using the first resource, a reference signal that is in the first resource and that is not located in the overlapping portion.

Optionally, when a plurality of reference signals are located in the overlapping portion, the determining, from the overlapping portion, a transmission resource used to transmit a part of the reference signal, or determining that all transmission resources in the overlapping portion are transmission resources not used to transmit the reference signal includes: determining priorities of the plurality of reference signals located in the overlapping portion; and determining, from the overlapping portion, a transmission resource used to transmit some reference signals whose priorities are relatively high in the plurality of reference signals, or determining that all the transmission resources in the overlapping portion are transmission resources not used to transmit at least one reference signal whose priority is relatively low in the plurality of reference signals.

Optionally, a priority of a reference signal is determined based on a type of the reference signal.

Optionally, a priority of an aperiodic reference signal is higher than that of a semi-persistent reference signal; and a priority of a semi-persistent reference signal is higher than that of a periodic reference signal.

Optionally, a plurality of reference signals in the first resource occupy M parallel frequency domain resources, and the determining, from the overlapping portion, a transmission resource used to transmit a part of the reference signal, or determining that all transmission resources in the overlapping portion are transmission resources not used to transmit the reference signal includes: determining, from N parallel frequency domain resources located in the overlapping portion, a frequency domain resource used to transmit a part of the reference signal, or determining that the N parallel frequency domain resources located in the overlapping portion are frequency domain resources not used to transmit the reference signal, where the N frequency domain resources are a subset of the M parallel frequency domain resources.

Optionally, the frequency domain resource includes a carrier, or a bandwidth part, or a subband.

Optionally, in the N parallel frequency domain resources, each frequency domain resource comes from a same configured reference signal, or comes from reference signals in a same frequency hopping mode.

Optionally, at least one of the N parallel frequency domain resources is determined based on a first parameter, where the first parameter includes any one of or a combination of more than one of the following parameters: indication information of a time domain or frequency domain resource of downlink control information used for scheduling; a bandwidth part identifier; a carrier identifier; an identifier of the first device; an identifier of a cell in which the first device is located; a space domain resource identifier; an identifier of a slot in which the first resource is located; and an identifier of a reference signal.

Optionally, a plurality of reference signals in the first resource occupy M parallel frequency domain resources, and the determining, from the overlapping portion, a transmission resource used to transmit a part of the reference signal, or determining that all transmission resources in the overlapping portion are transmission resources not used to transmit the reference signal includes: determining that all frequency domain resources in the overlapping portion are frequency domain resources not used to transmit a specific type of reference signal, where the specific type of reference signal includes a periodic reference signal or a semi-persistent reference signal.

Optionally, the determining, from the overlapping portion, a transmission resource used to transmit a part of the reference signal, or determining that all transmission resources in the overlapping portion are transmission resources not used to transmit the reference signal includes: obtaining a priority of a reference signal in the overlapping portion and a priority of a first message, where the first message is located in a time domain portion that is in the second resource and that overlaps with the first resource; and if the priority of the reference signal in the overlapping portion is lower than the priority of the first message, determining, from the overlapping portion, a transmission resource used to transmit a part of the reference signal, or determining that all the transmission resources in the overlapping portion are transmission resources not used to transmit the reference signal.

Optionally, the first message includes an urgent message and a non-urgent message, where the urgent message includes a hybrid automatic repeat request HARQ response message, scheduling request SR information, or beam failure request information; and the non-urgent message is a message other than the urgent message; and whether the priority of the reference signal in the overlapping portion is higher or lower than the priority of the first message is determined in the following manner: a priority of the urgent message is higher than the priority of the reference signal in the overlapping portion; and when the reference signal in the overlapping portion is an aperiodic reference signal, the priority of the reference signal in the overlapping portion is higher than a priority of a non-urgent message; or when the reference signal in the overlapping portion is a semi-persistent reference signal, the priority of the reference signal in the overlapping portion is higher than a priority of a non-urgent message.

Optionally, the type of the reference signal includes: a periodic reference signal, an aperiodic reference signal, a semi-persistent reference signal, or a reference signal used to capture channel state information.

Optionally, if transmit power for transmitting a symbol in the overlapping portion exceeds predefined power, a transmission resource used to transmit a part of the reference signal is determined from the overlapping portion, or it is determined that all the transmission resources in the overlapping portion are transmission resources not used to transmit the reference signal.

According to a fourth aspect, an embodiment of this application provides an apparatus for determining a transmission resource of a reference signal. The apparatus may be a network device or a terminal device, or may be a chip inside a network device or inside a terminal device. The apparatus may include a processing unit and a transceiver unit. When the apparatus is a network device or a terminal device, the processing unit may be a processor, and the transceiver unit may be a transceiver; the network device or the terminal device may further include a storage unit, where the storage unit may be a memory, and the storage unit is configured to store an instruction, and the processing unit executes the instruction stored in the storage unit, so that the network device or the terminal device performs the method according to the third aspect. When the apparatus is a chip inside a network device or inside a terminal device, the processing unit may be a processor, and the transceiver unit may be an input/output interface, a pin, a circuit, or the like; and the processing unit executes an instruction stored in a storage unit, so that the network device or the terminal device performs the method according to the third aspect, where the storage unit may be a storage unit (for example, a register or a cache) in the chip, or may be a storage unit (for example, a read-only memory or a random access memory) located inside the network device or the terminal device but outside the chip.

According to a fifth aspect, an embodiment of this application provides a method for determining a transmission resource of a message. The method is applied to a first device, and the method includes: determining a first resource and a second resource, where the first resource is a transmission resource used to transmit a to-be-sent reference signal, and the second resource is a transmission resource used to transmit a to-be-sent message; determining an overlapping portion, where the overlapping portion includes a time domain portion that is in the second resource and that overlaps with the first resource; and determining, from the overlapping portion, a transmission resource used to transmit a part of the message, or determining that all transmission resources in the overlapping portion are transmission resources not used to transmit the message.

Optionally, the determining, from the overlapping portion, a transmission resource used to transmit a part of the message, or determining that all transmission resources in the overlapping portion are transmission resources not used to transmit the message includes: obtaining a priority of a reference signal and a priority of a message in the overlapping portion, where the reference signal is located in a time domain portion that is in the first resource and that overlaps with the second resource; and if the priority of the reference signal is higher than the priority of the message, determining, from the overlapping portion, a transmission resource used to transmit a part of the message, or determining that all the transmission resources in the overlapping portion are transmission resources not used to transmit the message.

Optionally, the message includes an urgent message and a non-urgent message, where the urgent message includes a hybrid automatic repeat request HARQ response message, scheduling request SR information, or beam failure request information; and the non-urgent message is a message other than the urgent message; and whether the priority of the reference signal is higher or lower than the priority of the message is determined in the following manner: a priority of the urgent message is higher than the priority of the reference signal; and when the reference signal is an aperiodic reference signal, the priority of the reference signal is higher than a priority of a non-urgent message; or when the reference signal is a semi-persistent reference signal, the priority of the reference signal is higher than a priority of a non-urgent message.

Optionally, if the message includes a demodulation reference signal, it is determined that the priority of the reference signal is lower than the priority of the message.

Optionally, the message and the reference signal are located in a same carrier, or located in different bandwidth parts of a same carrier, or located in a same bandwidth part of a same carrier; and the reference signal is located in a time domain portion that is in the first resource and that overlaps with the second resource.

According to a sixth aspect, an embodiment of this application provides an apparatus for determining a transmission resource of a message. The apparatus may be a network device or a terminal device, or may be a chip inside a network device or inside a terminal device. The apparatus may include a processing unit and a transceiver unit. When the apparatus is a network device or a terminal device, the processing unit may be a processor, and the transceiver unit may be a transceiver; the network device or the terminal device may further include a storage unit, where the storage unit may be a memory; and the storage unit is configured to store an instruction, and the processing unit executes the instruction stored in the storage unit, so that the network device or the terminal device performs the method according to the fifth aspect. When the apparatus is a chip inside a network device or inside a terminal device, the processing unit may be a processor, and the transceiver unit may be an input/output interface, a pin, a circuit, or the like; and the processing unit executes an instruction stored in a storage unit, so that the network device or the terminal device performs the method according to the fifth aspect, where the storage unit may be a storage unit (for example, a register or a cache) in the chip, or may be a storage unit (for example, a read-only memory or a random access memory) located inside the network device or the terminal device but outside the chip.

According to a seventh aspect, an embodiment of this application provides a reference signal transmission method. The method is applied to a first device, and the method includes: determining a slot used to send a reference signal; if it is determined that the slot is not suitable for transmitting the reference signal or the slot does not have a transmission resource used to transmit the reference signal, re-determining a transmission resource used to transmit the reference signal, and transmitting the reference signal on the transmission resource used to transmit the reference signal.

Optionally, the determining a slot used to send a reference signal includes: determining a type of the slot, where the type of the slot is determined based on a function of the slot and/or a quantity of transmitting resources and a quantity of receiving resources in the slot.

Optionally, the re-determining a transmission resource used to transmit the reference signal includes: adding, by the first device, the transmission resource used to transmit the reference signal in the slot.

Optionally, if the type of the slot is not suitable for transmitting the reference signal, the method further includes: adding the transmission resource used to transmit the reference signal in the slot, and setting a switching gap in a remaining transmission resource of the slot.

Optionally, the re-determining a transmission resource used to transmit the reference signal includes: switching from the slot to a slot suitable for transmitting the reference signal; and determining, from the slot, the transmission resource used to transmit the reference signal.

Optionally, if the slot has a transmission resource used to transmit control information, the transmission resource used to transmit the reference signal and the transmission resource used to transmit the control information are multiplexed in a time domain adjacency manner.

Optionally, if there are a plurality of parallel frequency domain resources in the slot and the frequency domain resource includes a bandwidth part or a carrier, that the slot does not have a transmission resource used to transmit the reference signal includes: a first frequency domain resource does not have the transmission resource used to transmit the reference signal, where the first frequency domain resource is one of the plurality of frequency domain resources, and the re-determining a transmission resource used to transmit the reference signal includes: determining, from a second frequency domain resource, the transmission resource used to transmit the reference signal, where the second frequency domain resource is one of the plurality of frequency domain resources; or if control information is located in the first frequency domain resource, mapping the control information to the second frequency domain resource, and determining, from the first frequency domain resource, the transmission resource used to transmit the reference signal.

Optionally, after the re-determining a transmission resource used to transmit the reference signal, the method further includes: sending indication information to a base station, where the indication information is used to indicate the re-determined transmission resource used to transmit the reference signal.

Optionally, the indication information includes: a parameter of a sequence used to transmit the reference signal, or a location of a time-frequency resource used to transmit the reference signal.

Optionally, the reference signal includes any one of the following: a sounding reference signal, a demodulation reference signal, a phase tracking reference signal, a channel state information-reference signal, a random access reference signal, or a positioning reference signal.

According to an eighth aspect, an embodiment of this application provides a reference signal transmission apparatus. The apparatus may be a network device or a terminal device, or may be a chip inside a network device or inside a terminal device. The apparatus may include a processing unit and a transceiver unit. When the apparatus is a network device or a terminal device, the processing unit may be a processor, and the transceiver unit may be a transceiver; the network device or the terminal device may further include a storage unit, where the storage unit may be a memory; and the storage unit is configured to store an instruction, and the processing unit executes the instruction stored in the storage unit, so that the network device or the terminal device performs the method according to the seventh aspect. When the apparatus is a chip inside a network device or inside a terminal device, the processing unit may be a processor, and the transceiver unit may be an input/output interface, a pin, a circuit, or the like; and the processing unit executes an instruction stored in a storage unit, so that the network device or the terminal device performs the method according to the seventh aspect, where the storage unit may be a storage unit (for example, a register or a cache) in the chip, or may be a storage unit (for example, a read-only memory or a random access memory) located inside the network device or the terminal device but outside the chip.

According to a ninth aspect, an embodiment of this application provides a reference signal transmission method. The method includes: obtaining parameter configuration information of a first reference signal and parameter configuration information of a second reference signal; determining association configuration information, where the association configuration information is used to determine an association relationship between the parameter configuration information of the first reference signal and the parameter configuration information of the second reference signal; and sending the first reference signal, the second reference signal, and the association configuration information.

Optionally, the parameter configuration information of the first reference signal includes at least one of the following: a quantity N of symbols used to transmit the first reference signal, time domain locations of the N symbols of the reference signal, precoding values or beam directions used for the N time domain symbols, locations of the N time domain symbols in frequency domain, and a parameter for generating a sequence to be used for the N time domain symbols, where N is a positive integer.

Optionally, the parameter for generating the sequence to be used for the N time domain symbols includes: a root sequence number, a cyclic shift value, and an orthogonal sequence index.

Optionally, the association configuration information includes any one of or a combination of more than one of the following: indexes of time domain resources for transmitting the first reference signal and the second reference signal, a beam identifier, a subcarrier spacing identifier, a reference signal source identifier, an identifier indicating transmitter, a carrier identifier, a bandwidth part identifier, a cell identifier, and an index of a time domain or frequency domain resource in which control signaling for scheduling a reference signal is located.

According to a tenth aspect, an embodiment of this application provides a reference signal transmission apparatus. The apparatus may be a network device or a terminal device, or may be a chip inside a network device or inside a terminal device. The apparatus may include a processing unit and a transceiver unit. When the apparatus is a network device or a terminal device, the processing unit may be a processor, and the transceiver unit may be a transceiver; the network device or the terminal device may further include a storage unit, where the storage unit may be a memory, and the storage unit is configured to store an instruction, and the processing unit executes the instruction stored in the storage unit, so that the network device or the terminal device performs the method according to the ninth aspect. When the apparatus is a chip inside a network device or inside a terminal device, the processing unit may be a processor, and the transceiver unit may be an input/output interface, a pin, a circuit, or the like; and the processing unit executes an instruction stored in a storage unit, so that the network device or the terminal device performs the method according to the ninth aspect, where the storage unit may be a storage unit (for example, a register or a cache) in the chip, or may be a storage unit (for example, a read-only memory or a random access memory) located inside the network device or the terminal device but outside the chip.

According to an eleventh aspect, an embodiment of this application provides a computer storage medium, where the computer storage medium stores an instruction, and when the instruction is run on a computer, the computer is enabled to perform the method according to the first aspect, the third aspect, the fifth aspect, the seventh aspect, or the ninth aspect.

According to a twelfth aspect, an embodiment of this application provides a computer program product including an instruction, where when the instruction is run on a computer, the computer is enabled to perform the method according to the first aspect, the third aspect, the fifth aspect, the seventh aspect, or the ninth aspect.

It can be learned from the foregoing technical solutions that the embodiments of this application have the following advantages:

When the first device needs to transmit the reference signal, the first device may determine, from the slot and based on the time domain resource parameter of the reference signal, the transmission resource information related to the transmission resource used to transmit the reference signal, where the transmission resource information may include the symbol location of the transmission resource in the slot and/or the space domain resource on the symbol in the transmission resource. Compared with a conventional manner in which a reference signal can be transmitted only at a fixed location, the transmission resource for transmitting the reference signal can be dynamically determined based on the time domain resource parameter of the reference signal. This reduces a probability of colliding with sending of another message during sending of the reference signal, thereby improving system transmission efficiency.

DESCRIPTION OF EMBODIMENTS

Figure 1A:
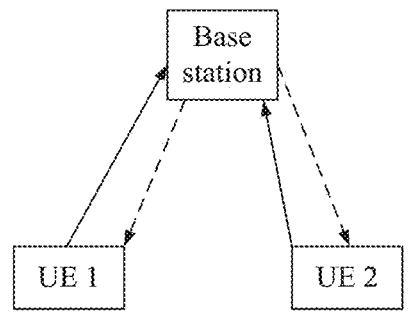
FIG. 1a is a schematic diagram of a scenario of a cellular link according to an embodiment of this application.

The following describes embodiments of this application with reference to accompanying drawings.

For different communication requirements, various types of reference signals need to be transmitted between devices. However, a first device that needs to send a reference signal also needs to transmit other information, for example, data, control information, or another reference signal to be transmitted in parallel, in addition to the reference signal to a second device. The first device needs to use a transmission resource, for example, a carrier (Component Carrier (CC)), both when transmitting information and when transmitting a reference signal. When the first device is ready to transmit a reference signal, a transmission resource prepared for transmitting the reference signal is probably already occupied by information; or in a frequency division multiplexing scenario, a transmission resource prepared for transmitting the reference signal overlaps with a transmission resource used to transmit information in terms of a time domain location. In these cases, a collision may be caused between a transmission resource used to send the reference signal and a transmission resource used to send other information. In other words, when a slot for sending the reference signal arrives, for the first device to ensure transmission performance and prevent a demodulation or decoding error on the second device, in a possible manner, the first device discards the reference signal, that is, skips sending the reference signal to the second device.

In a 5th-generation (5G) mobile communications technology, a quantity of symbols used to transmit a reference signal is greater than that in 4G For example, a maximum of four symbols are needed to transmit a reference signal. If a collision occurs directly during transmission of a reference signal, the reference signal is discarded, degrading transmission performance. It can be learned that, a problem to be urgently resolved in 5G is how to properly handle a collision between a transmission resource used by a device to send a reference signal and a transmission resource used by the device to send another message. This is because a greater quantity of symbols are needed to transmit a reference signal in the 5G field, and transmission performance is much more affected if the collision cannot be effectively resolved.

To properly handle a possible collision with a transmission resource used to send another message during transmission of a reference signal, the embodiments of this application have changed conventional manners of determining a transmission location of a reference signal. In a conventional manner, for example, in the 4G field, a location at which a reference signal is sent is fixed. For example, a device to send a reference signal can send the reference signal only in a fixed subframe, and this cannot be changed. However, generally, control information further needs to be sent in the subframe in which the reference signal is sent. Therefore, once the device needs to send control information, a collision occurs between a transmission resource used to send the reference signal and a transmission resource used to send the control information, affecting transmission performance. It can be learned that, in the conventional manner, a collision easily occurs mainly because a location at which a reference signal is transmitted is fixed and cannot be changed, and sometimes, control information further needs to be sent at the location at which the reference signal is transmitted.

Therefore, the embodiments of this application provide a reference signal transmission method for the 5G field. Before transmitting a reference signal, a first device may dynamically determine, based on a time domain resource parameter of a to-be-sent reference signal, a transmission resource used to transmit the reference signal; and send the reference signal on the determined transmission resource. In this way, when sending different reference signals, the first device may use symbols at different locations in a slot. In other words, a transmission resource used to transmit a reference signal is probably not a transmission resource often used to transmit control information. In this manner of dynamically determining a transmission resource of a reference signal, when the first device needs to send control information or other information by using a transmission resource, a probability of a collision between a used transmission resource and the transmission resource used by the first device to send the reference signal decreases, thereby improving transmission performance of the first device.

The embodiments of this application relate to the first device that needs to send a reference signal, and a second device that needs to receive the reference signal. The first device may include a transmitting device, and the second device may include a receiving device. The first device and the second device each may be various types of network elements having a transmission function, for example, may be a base station (BS), a repeater device, terminal equipment (TE), or an evolved NodeB (eNB). The TE may include user equipment (UE).

Figure 1B:
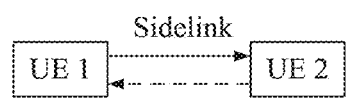
FIG. 1b is a schematic diagram of a scenario of a D2D link according to an embodiment of this application.

A scenario to which the embodiments of this application are applicable may include a cellular link, or may include a device-to-device (D2D) link. In a case of a cellular link, the first device may be UE, and the second device may be a base station. For example, as shown in FIG. 1a, UE and a base station communicate with each other through an uplink and a downlink. In a case of a D2D link, the first device and the second device each may be UE. For example, as shown in FIG. 1b, UE 1 and UE 2 communicate with each other through a sidelink.

In the embodiments of this application, a slot may be a set of transmission resources that include a particular quantity of symbols, where a slot location may be used to identify a location of the slot in a transmission sequence. Duration occupied by one slot may be fixed, or may be determined based on a subcarrier spacing used for the slot. Usually, a quantity of symbols included in one slot is predefined. For example, one slot may include seven symbols, 12 symbols, or 14 symbols.

In the embodiments of this application, a symbol may be a time domain symbol used to transmit a reference signal or a message. A symbol may simultaneously include at least one subband, a bandwidth part, a carrier, a spread spectrum code channel, or one or more beam directions pointing to a specific space domain. A symbol may be a symbol in a multi-carrier system (which includes a plurality of carrier units in frequency domain), or may be a symbol in a single-carrier system or a symbol in a spread spectrum system. A carrier unit in a multi-carrier system may be a carrier unit in an orthogonal frequency division multiplexing (OFDM) system, or may be a carrier unit in an OFDM system based on discrete Fourier transform (DFT) spread. This is not limited in the embodiments of this application.

Embodiment 1

This embodiment mainly describes a reference signal transmission method, and various manners concerning how to dynamically determine a transmission resource used to transmit a reference signal before the reference signal is transmitted.

Figure 2:
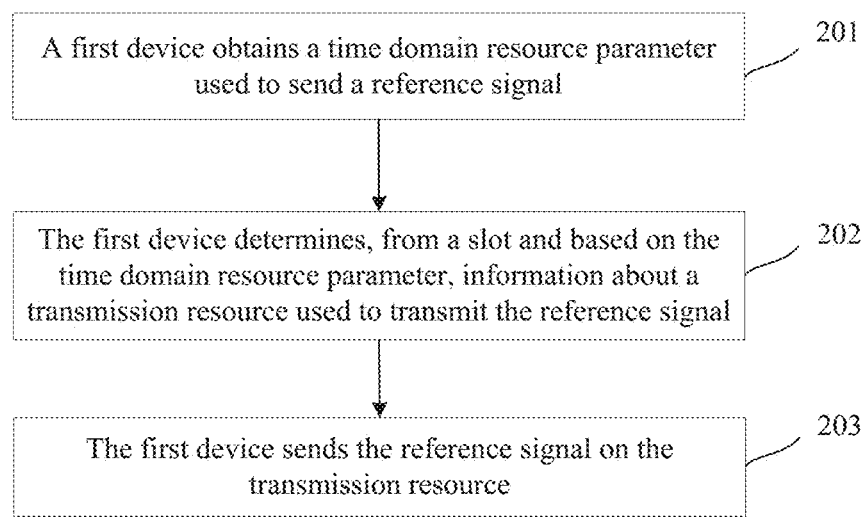
FIG. 2 is a flowchart of a reference signal transmission method according to an embodiment of this application.

With reference to the accompanying drawings, the following describes the reference signal transmission method provided in this embodiment of this application. As shown in FIG. 2, the method includes the following steps.

201. A first device obtains a time domain resource parameter used to send a reference signal.

In this embodiment of this application, the reference signal may include different types of reference signals, for example, an SRS, a DMRS, a random access reference signal, a phase tracking reference signal, a channel state information-reference signal, or a positioning reference signal. A specific type of the reference signal that the first device needs to send may be related to a communication requirement, or may be related to an application scenario.

The time domain resource parameter may include related information used to indicate a time domain resource on which the reference signal is located. The first device may determine, based on the time domain resource information, a parameter of a time domain resource used to transmit the reference signal.

The first device may obtain the time domain resource parameter when needing to send the reference signal, or the first device may obtain the time domain resource parameter when being instructed to send the reference signal.

In this embodiment of this application, a manner in which the first device obtains the time domain resource parameter is not limited. For example, the first device may determine and obtain the time domain resource parameter based on a location of a slot for sending the reference signal.

In this embodiment of this application, the time domain resource parameter of the reference signal may include a type of a slot used to send the reference signal and/or an index of a time domain resource for sending the reference signal.

First, a meaning of the time domain resource index is described. The time domain resource index may be indication information of the time domain resource used to send the reference signal, for example, a slot index, a subframe index, or a frame index; and may be used to instruct the first device to place the reference signal into a particular slot or some particular slots for transmission.

Next, a meaning of the slot type is described. A slot type of a slot may indicate a particular type of the slot. The slot type may be used to indicate, to the first device, what type of slot is used to transmit the reference signal.

The slot type may be predefined, for example, slots are classified based on a preset condition; or the slot type may be determined based on a function of the slot and/or a quantity of transmitting resources and a quantity of receiving resources in the slot.

For a manner in which the slot type is determined based on the function of the slot:

It may be understood as: using a major function that the slot can implement as a criterion for determining the type of the slot. For example, for a device, when a major function of a slot is for the device to receive information, a type of the slot may be a receiving type or a receiving-dominant type; or when a major function of a slot is for the device to transmit information, a type of the slot may be a transmitting type or a transmitting-dominant type.

For a manner in which the slot type is determined based on a quantity of transmitting resources and a quantity of receiving resources in the slot:

It may be understood as: using the quantity of transmitting resources and the quantity of receiving resources in the slot as a criterion for determining the type of the slot.

First, meanings of a transmitting resource and a receiving resource are clarified. Both a transmitting resource and a receiving resource are transmission resources in a slot. When a transmission resource is used to send information, the transmission resource may be a transmitting resource; or when a transmission resource is used to receive information, the transmission resource may be a receiving resource.

In different application scenarios, there may be different specific implementations of a transmitting resource and a receiving resource. In a cellular link scenario, if the first device is UE, a transmitting resource may be an uplink transmission resource, and a receiving resource may be a downlink transmission resource. For example, as shown in FIG. 1a, a transmission resource used by UE 1 to send information to a base station may be an uplink transmission resource, and a transmission resource used by the UE 1 to receive information from the base station may be a downlink transmission resource. In a D2D link scenario, for example, as shown in FIG. 1b, if the first device is UE 1, a transmitting resource may be a transmission resource used by the UE 1 to send information to UE 2, and a receiving resource may be a transmission resource used by the UE 1 to receive information from the UE 2. In this embodiment of this application, the information may include: data, a reference signal, control information, and the like. In the cellular link scenario, a slot type may be one or more of an uplink slot, a downlink slot, an uplink-dominant slot, a downlink-dominant slot, a slot with configurable uplink and downlink resources, or the like. When a D2D link is considered, a slot may be alternatively a sidelink slot; or when a wireless backhaul link or a trunk link is considered, a slot may be alternatively a backhaul slot or a trunk slot.

When all transmission resources in a slot are transmitting resources, a type of this slot may be the transmitting type; or when all transmission resources in a slot are receiving resources, a type of this slot may be the receiving type; or when there are both transmitting resources and receiving resources in a slot, if there are quite many transmitting resources, a type of this slot may be the transmitting-dominant type, or if there are quite many receiving resources, a type of this slot may be the receiving-dominant type.

202. The first device determines, from a slot and based on the time domain resource parameter, information about a transmission resource used to transmit the reference signal.

203. The first device sends the reference signal on the transmission resource.

The first device may determine, based on the time domain resource parameter obtained in 201, a slot used to transmit the reference signal, and may determine transmission resource information from the slot, where the transmission resource information may indicate a transmission resource used to transmit the reference signal. Different transmission resource information can be determined for different time domain resource parameters, to indicate different transmission resources used to transmit reference signals. For different types of reference signals, transmission resources at different locations in corresponding slots can be determined. For different reference signals of a same type, transmission resources at different locations in corresponding slots can also be determined. For a plurality of reference signals to be transmitted for a same communication requirement, transmission resources at different locations in corresponding slots can also be determined. In this way, a transmission resource of a reference signal is dynamically determined.

The transmission resource information includes a symbol location of the transmission resource in the slot and/or a space domain resource on a symbol in the transmission resource.

The foregoing has clarified that one slot may include a plurality of symbols. Therefore, a symbol in the transmission resource in the slot can be determined based on the symbol location; and the space domain resource on the symbol can be used to determine a space domain resource for use when the reference signal is transmitted on the symbol, for example, a beam direction of a beam used to transmit the reference signal, or a precoding parameter for use when the reference signal is transmitted by using a plurality of antennas.

In this embodiment of this application, a beam (beam or beam forming) may be a space-transmitted wave, with particular directivity, formed by the first device by using a particular beam forming manner. The beam forming manner may be a beam formed based on an analog circuit, or may be a beam formed based on a plurality of digital antenna ports by using a precoding vector or matrix. This is not limited in this embodiment of this application. The beam has particular spatial directivity, and a beam direction may be used to indicate a spatial pointing direction of the beam.

It should be noted that, a quantity of slots for transmitting the reference signal is not limited to only one, but may be alternatively a plurality of consecutive slots. In a case of a plurality of slots, the first device may determine, from the plurality of consecutive slots and based on the time domain resource parameter, the information about the transmission resource used to transmit the reference signal. In addition, slot types of the plurality of slots may be the same or different.

Figure 3:
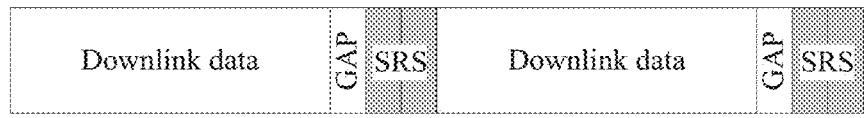
FIG. 3 is a schematic diagram of discontinuous distribution of a transmission resource of a reference signal according to an embodiment of this application.

In this case, a plurality of symbols of the transmission resource used to transmit the reference signal may be consecutive symbols in time domain or nonconsecutive symbols in time domain, and may be continuously or discontinuously distributed in the plurality of consecutive slots. For example, FIG. 3 shows a case of discontinuous distribution in a plurality of consecutive slots. Four symbols are needed to transmit an SRS. In two consecutive slots, the first device separately determines, from one slot, two symbols used to transmit the SRS, and determines, from an adjacent slot, the other two symbols used to transmit the SRS.

It should be further noted that, the transmission resource for transmitting the reference signal includes N symbols, where N is a positive integer greater than 1, at least two of the N symbols occupy a same frequency domain resource of the reference signal, and the reference signal is generated by multiplying an orthogonal sequence whose length is N by a reference signal sequence whose length is L.

Specifically, transmission of an SRS may also be used in a scenario of enhanced coverage. To be specific, a coverage capability during the transmission can be further expanded while the SRS satisfies a requirement for channel state information CSI measurement or beam management. To expand the coverage capability, a common practice is that at least two of N symbols for the SRS transmission occupy a same frequency domain resource of the reference signal. When all symbols in the N symbols for the SRS transmission are the same, an optimal expanded-coverage capability can be achieved.

Figure 4:
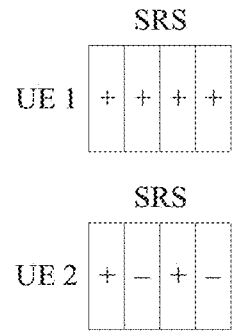
FIG. 4 is a schematic diagram of generating a reference signal sequence according to an embodiment of this application.

For example, as shown in FIG. 4, in a possible implementation, UE 1 and UE 2 have two SRSs, where N is 4 for both, and a same time domain symbol location is used to transmit the two SRSs. In addition, an orthogonal sequence used by the UE 1 is W1=[++++], and an orthogonal sequence used by the UE 2 is W2=[+−+−]; or W1 and W2 may be [++−−] and [+−−−]. An orthogonal sequence W may have mutually orthogonal rows or columns taken from an orthogonal matrix. The SRSs used by the UE 1 and the UE 2 occupy a same frequency domain resource. Therefore, although the SRSs of the UE 1 and the UE 2 use a same time-frequency resource, they can use time domain orthogonal sequences of W1 and W2 to perform orthogonal discrimination.

During implementation of sequence generation by the UEs:

UE 1: $y1(n, :)=W1(n)*S1(n, :)$, $n=0, 1, 2, 3$
UE 2: $y2(n, :)=W2(n)*S2(n, :)$, $n=0, 1, 2, 3$ where $Wi(n)$ represents the $n^{th}$ element in an orthogonal sequence on UE i;

$Si(n, :)$ represents an SRS sequence on the $n^{th}$ symbol on UE i, where a sequence length of an SRS on the $n^{th}$ symbol is L; and $yi(n, :)$ represents an SRS sequence on each symbol on UE i, where the SRS sequence is generated from an SRS sequence $Si(n, :)$ on the symbol and an orthogonal sequence element $Wi(n)$ on the symbol.

According to the method in this embodiment, coverage of the SRSs can be expanded, and orthogonality between different UEs can be further implemented after the time domain orthogonal sequences are used, without affecting resource usage efficiency. This is because, although four symbols are simultaneously used for one UE, the four symbols at a same frequency domain location can still be separately allocated to four different UEs by using four different time domain orthogonal sequences, thereby improving a coverage capability without decreasing usage efficiency of an SRS resource.

It can be learned that, when the first device needs to transmit the reference signal, the first device may determine, from the slot and based on the time domain resource parameter of the reference signal, the transmission resource information related to the transmission resource used to transmit the reference signal, where the transmission resource information may include the symbol location of the transmission resource in the slot and/or the space domain resource on the symbol in the transmission resource. Compared with a conventional manner in which a reference signal can be transmitted only at a fixed location, in this application, the transmission resource for transmitting the reference signal can be dynamically determined based on the time domain resource parameter of the reference signal. This reduces a probability of colliding with sending of another message during sending of the reference signal, thereby improving system transmission efficiency.

The following further describes, based on different specific time domain resource parameters or specific application scenarios, the determining, by the first device, from a slot and based on the time domain resource parameter, information about a transmission resource used to transmit the reference signal, that is, some possible implementations of step 202.

First Implementation:

In this implementation, the time domain resource parameter may be a slot type, and the transmission resource information may be a symbol location of the transmission resource in the slot, and the reference signal may be an SRS.

In an application scenario of a cellular link, it is assumed that the first device is UE, and the UE needs to transmit a reference signal to a base station. A slot type corresponding to the reference signal may include any one or more of the following:

uplink slot: this means that all transmission resources in a slot are used to transmit only uplink information;

downlink slot: this means that all transmission resources in a slot are used to transmit only downlink information;

downlink-dominant slot: this means that, in a slot, most transmission resources are used to transmit downlink information, and a relatively small quantity of transmission resources are used to transmit uplink information;

uplink-dominant slot: this means that, in a slot, most transmission resources are used to transmit uplink information, and a relatively small quantity of transmission resources are used to transmit downlink information;

slot with dynamic uplink and downlink configuration; this means that, in a slot, an uplink transmission resource and a downlink transmission resource are dynamically configured; and backhaul slot: this means that, in a slot, at least some transmission resources are used to transmit backhaul or trunk data.

In an application scenario of a D2D link, it is assumed that the first device is UE 1, and the UE 1 needs to transmit a reference signal to UE 2. A slot type corresponding to the reference signal may include any one or more of the following:

sidelink slot: this means that, in a slot, at least some transmission resources are used to transmit data from user equipment (UE) to another user equipment (UE).

For different slot types, there may be different transmission resources used to transmit the SRS, namely, the reference signal. The following describes some common slot types by using examples. It should be noted that, the following descriptions are only examples, and do not pose such a limitation that, for these slot types, only manners in the following examples can be used to determine a transmission resource used to transmit an SRS, namely, the reference signal.

For a downlink-dominant slot, a symbol location of the transmission resource used to transmit the SRS may include N symbols counted forward from a last symbol in the slot. Herein, N may be a quantity of symbols needed to transmit the SRS, and the last symbol in the slot may be a symbol to be sent last when the UE sends symbols in the slot. In this case, the transmission resource for transmitting the SRS may multiplex, through frequency division, these symbols together with a transmission resource for transmitting information, for example, uplink control information (UCI) or data.

For an uplink-dominant or uplink slot, a symbol location of the transmission resource used to transmit the SRS may be any location inside the slot, or may be any location other than a location occupied by UCI. For example, when the UCI is transmitted through a short uplink control channel, the SRS may include N symbols counted forward from last (M-1-K) symbols in the slot. Herein. M is a total quantity of symbols included in the slot, and K is a quantity of symbols needed to transmit information, for example, the UCI or data. In this case, the transmission resource for transmitting the SRS may multiplex, through time division, a symbol in this slot together with a transmission resource for transmitting information, for example, the UCI or data. For another example, when the UCI is transmitted through a long uplink control channel, the symbol location may be a symbol other than a symbol occupied by the UCI. In this case, if the UCI on the long uplink control channel is a symbol occupied starting from the beginning of the slot, the SRS occupies some symbols after the UCI.

For another example, in a case of a D2D link, a location of the SRS may be a first half of the slot, for example, some front symbols starting from the first symbol in the slot, or a plurality of symbols that follow some front-most symbols are excluded.

In this manner of determining the symbol location of the transmission resource for transmitting the SRS, a collision, caused by control information that the UE may transmit, to the transmission of the reference signal is considered. In other words, during selection of the symbol location, a symbol location at which a control signal may need to be transmitted is intentionally excluded, so as to avoid, in a frequency division multiplexing scenario, time domain overlapping between the transmission resource for transmitting the reference signal and a transmission resource for transmitting information, thereby avoiding a transmission collision.

In this implementation, the first device may determine, based on configuration performed by a base station by using signaling, symbol locations that correspond to different slot types and that are of a transmission resource for transmitting a reference signal; or the first device may determine, based on a specified or preset association relationship, symbol locations that correspond to different slot types and that are of a transmission resource for transmitting a reference signal.

For the determining, based on an association relationship, symbol locations that correspond to different slot types and that are of a transmission resource for transmitting a reference signal, the first device may determine, based on a slot type of the slot, the symbol location, in the slot, of the transmission resource used to transmit the reference signal, where each slot type is associated with a symbol location that is of the reference signal in the slot and that corresponds to the slot type; or the first device may determine, based on a slot type of the slot, the symbol location, in the slot, of the transmission resource used to transmit the reference signal and a quantity of symbols, where each slot type is associated with a quantity of symbols and a symbol location that is of the reference signal in the slot and that corresponds to the slot type.

It can be learned that, when the symbol location of the transmission resource is determined based on the slot type, because symbol locations determined based on different slot types for the transmission resource may be different, a probability of colliding with sending of another message is reduced during sending of the reference signal, thereby improving system transmission efficiency.

Second Implementation:

A major application scenario to which this implementation is applicable may be a cellular link scenario. The first device is located in a communications cell, and the first device may determine, from the slot and based on the time domain resource parameter and a first parameter, the information about the transmission resource used to transmit the reference signal. The first parameter may include any one of or a combination of more than one of a carrier identifier, a bandwidth part identifier, a cell identifier, a beam identifier, and a subcarrier spacing.

The corresponding transmission resource of the reference signal may be associated with the foregoing parameter by using one or more of the first parameter. For example, the reference signal may be mapped onto a specific carrier by using the time domain resource index and a carrier identifier. For another example, the reference signal may be mapped onto a specific bandwidth part by using the time domain resource index and a bandwidth part identifier. Because parameters, such as a cell identifier, a beam identifier, and a subcarrier spacing, can be independently configured in a system, they may be combined with the time domain resource parameter, to determine a location of the reference signal on a resource having a corresponding characteristic or in a resource set having a corresponding characteristic. In addition, because these parameters are independent of each other, a plurality of these parameters may be combined for use. For example, if the transmission resource of the reference signal is determined by using the time domain resource parameter, a carrier identifier, and a beam identifier, it means that: the transmission resource of the reference signal is mapped onto a corresponding carrier and a corresponding beam, and the location of the reference signal is determined based on a corresponding time domain resource. Other parameters may also be combined, or used together, and examples thereof are not enumerated one by one in this embodiment.

In this way, the information about the transmission resource used to transmit the reference signal is determined by using the first parameter related to a communications cell, and the determined transmission resource can better comply with a communications characteristic of the cell, so that the first device can more properly transmit the reference signal in the cell, thereby improving transmission efficiency.

Third Implementation:

In this implementation, a predefined transmission resource set or a transmission resource set configured by using signaling is provided, where the transmission resource set is located in the slot for sending the reference signal; and the first device may determine, from the transmission resource set and based on the time domain resource parameter, the information about the transmission resource used to transmit the reference signal.

When the reference signal is sent by using a plurality of slots, the transmission resource set may be located in the plurality of slots. The transmission resource set includes M symbols, and a quantity of symbols included in the transmission resource used to transmit the reference signal is N, where M≥N. When the transmission resource set may be located in a plurality of slots, the M symbols may also be located in the plurality of slots.

It should be noted that, after the N symbols used to transmit the reference signal are determined from the M symbols of the transmission resource set, if there is a remaining symbol in the transmission resource set, the remaining symbol may be used to transmit other information or may not be used to transmit information.

Figure 5:
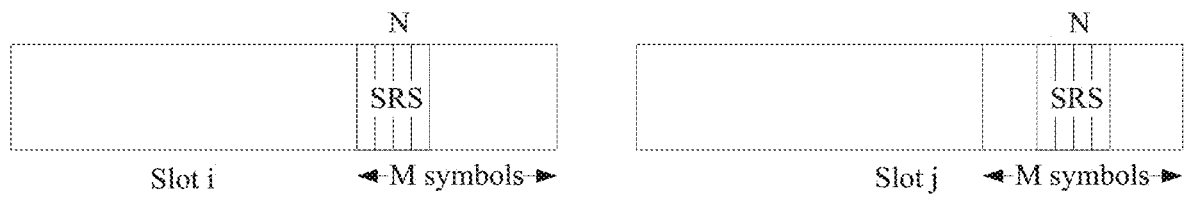
FIG. 5 is a schematic diagram of layout of a transmission resource of a reference signal in a transmission resource set in different slots according to an embodiment of this application.

In this implementation, N symbols of the transmission resource that are determined from the M symbols of the transmission resource set each time may vary. For example, as shown in FIG. 5, when the reference signal needs to be sent for a plurality of times or periodically, N symbols determined from a slot i for the transmission resource and N symbols determined from a slot j for the transmission resource are located at different locations in the M symbols of the transmission resource set. This reduces a probability of colliding with sending of another message during sending of the reference signal, thereby improving system transmission efficiency.

After the transmission resource set is clarified, the following describes how the first device determines, from the transmission resource set, the information about the transmission resource used to transmit the reference signal. This embodiment of this application provides three optional manners.

Manner 1:

When the time domain resource parameter of the reference signal is a time domain resource index, the first device may determine, based on the time domain resource index of the reference signal and a specific step length parameter, locations of the N symbols used to transmit the reference signal in the M symbols of the transmission resource set. This may be implemented through calculation by using Formula 1:

$$Nx = (Ni * \Delta) \bmod M \quad \text{(Formula 1)}$$

where Nx represents a location of the first symbol of the reference signal in the M symbols of the transmission resource set, Ni is the time domain resource index, Δ is the specific step length parameter, mod represents a modulo operation, and M is a total quantity of symbols in the transmission resource set.

Specifically, when Δ=1, M=8, and slots of Ni are slots 0, 5, 10, 15, and 20, in a corresponding transmission resource set in the five slots, locations of the first symbol in the transmission resource used to transmit the reference signal are calculated as follows based on Formula 1: Nx=0, 5, 2, 7, 4.

Manner 2:

When the time domain resource parameter of the reference signal is a time domain resource index and the reference signal needs to be sent at a cycle, the first device may determine, based on the time domain resource index of the reference signal, a specific step length parameter, and the cycle, locations of the N symbols used to transmit the reference signal in the M symbols of the transmission resource set. This may be implemented through calculation by using Formula 2:

$$Nx = (Nx0 + T * \Delta) \bmod M \quad \text{(Formula 2)}$$

where Nx0 represents a location of the first symbol, during last sending of the reference signal, in the transmission resource used to transmit the reference signal in the transmission resource set, and T is the cycle at which the reference signal is sent.

Specifically, when Nx0=0. T=5 ms, and Δ=1, Nx=5. To be specific, during current sending of the reference signal, a location of the first symbol in the transmission resource used to transmit the reference signal is the fifth symbol of the M symbols in the transmission resource set.

In this way, the first device determines, based on time domain indication information and a parameter of a cell in which the first device is located, locations of the N symbols used to transmit the reference signal in the M symbols.

Manner 3:

It should be noted that, in a scenario in which the first device is located in a communications cell, the first device may alternatively determine, from the transmission resource set and based on the time domain resource parameter and a first parameter, the information about the transmission resource used to transmit the reference signal, where the first parameter includes any one of or a combination of more than one of a carrier identifier, a bandwidth part identifier, a cell identifier, a beam identifier, and a subcarrier spacing. Usage of a combination of a plurality of parameters is the same as the manner and principle of usage in the foregoing second implementation, and descriptions are not repeatedly enumerated herein.

When the time domain resource parameter of the reference signal is a time domain resource index, the first device may determine, based on the time domain resource index of the reference signal, a specific step, and the first parameter, locations of the N symbols used to transmit the reference signal in the M symbols of the transmission resource set. This may be implemented through calculation by using Formula 3 or Formula 4:

$$Nx=(Ni*\Delta+a) \bmod M \quad \text{(Formula 3)}$$

$$Nx=(Ni*\Delta+a+b) \bmod M \quad \text{(Formula 4)}$$

where a and b are the first parameter.

In this way, the information about the transmission resource used to transmit the reference signal is determined from the transmission resource set by using the first parameter related to a communications cell, and the determined transmission resource can better comply with a communications characteristic of the cell, so that the first device can more properly transmit the reference signal in the cell, thereby improving transmission efficiency.

Fourth Implementation:

In this implementation, the first device has M antenna ports, the time domain resource parameter includes the index of the time domain resource for sending the reference signal, the transmission resource information may be the space domain resource on the symbol in the transmission resource, and the space domain resource includes an antenna port identifier.

The first device may determine, from the slot and based on the index of the time domain resource for sending the reference signal, identifiers of K antenna ports used to transmit the reference signal, where K is a positive integer greater than 1, and the identifiers of the K antenna ports correspond to the K antenna ports in the M antenna ports.

When determining the identifiers of the K antenna ports, the first device may determine them further based on an offset parameter in addition to the time domain resource index. Therefore, when the reference signal needs to be sent for a plurality of times or periodically, identifiers of K antenna ports determined each time may not be the same. This reduces a probability of colliding with sending of another message during sending of the reference signal, thereby improving system transmission efficiency. This embodiment of this application provides two optional manners.

Manner 1:

Antenna port identifiers are determined in a cyclic manner. In the M antenna ports of the first device, antenna ports that correspond to the K antenna port identifiers and that are determined each time have a movement distance of K steps from K antenna ports determined last time. This may be implemented through calculation by using Formula 5:

$$a(n,k)=(n*K+k) \bmod M, k=0,1,\ldots,K-1; \quad \text{(Formula 5)}$$

where k represents the $k^{th}$ antenna port, K represents a quantity of antenna ports used in current transmission, M represents a maximum quantity of antenna ports available or supported by UE, mod represents a modulo operation, n represents the $n^{th}$ SRS symbol, and a(n, k) represents the $k^{th}$ antenna port on the $n^{th}$ SRS symbol.

Manner 2:

Antenna port identifiers are cyclically determined by using a specific step. In the M antenna ports of the first device, antenna ports that correspond to the K antenna port identifiers and that are determined each time have a movement distance of a fixed step length from K antenna ports determined last time. This may be implemented through calculation by using Formula 6:

$$a(n,k)=(\Delta*n+k) \bmod M, k=0,1,\ldots,K-1; \quad \text{(Formula 6)}$$

Figure 6:
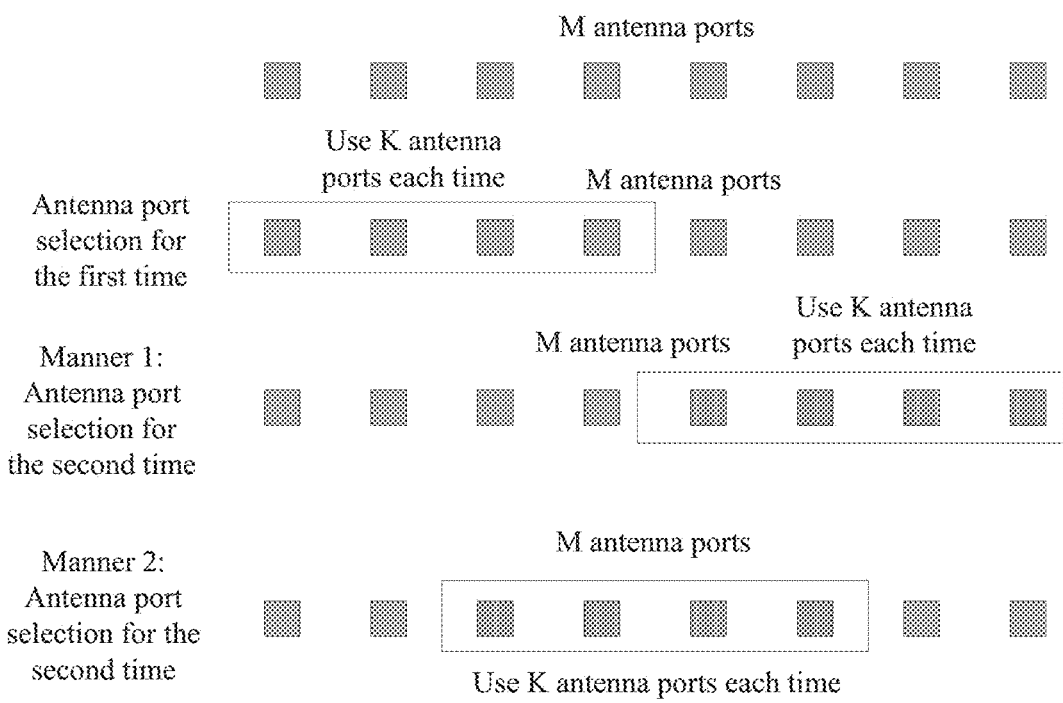
FIG. 6 is a schematic diagram of antenna port selection according to an embodiment of this application.

For a difference in antenna port selection between the foregoing two manners, refer to FIG. 6. In a scenario shown in FIG. 6. K=4, M=8, and Δ=2.

Fifth Implementation:

In this implementation, the transmission resource information may be the space domain resource on the symbol in the transmission resource, and the space domain resource includes a beam direction of a beam used to transmit the reference signal.

The first device may determine, from the slot and based on the time domain resource parameter and a predefined mode, a beam direction of each symbol in the transmission resource used to transmit the reference signal, so that the beam direction of each symbol in the transmission resource varies; or the first device determines, from the slot and based on the time domain resource parameter and a predefined mode, a beam direction of each symbol in the transmission resource used to transmit the reference signal, so that if the transmission resource is a transmission resource used to transmit the $i^{th}$ reference signal, a beam direction of the $j^{th}$ symbol in the transmission resource is different from a beam direction of the $j^{th}$ symbol in a transmission resource used to transmit the $(i-1)^{th}$ reference signal.

Figure 7:
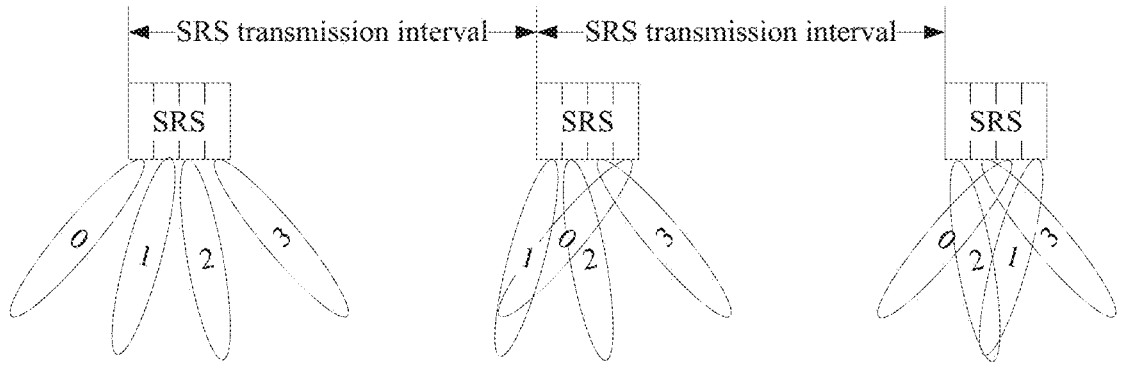
FIG. 7 is a schematic diagram of determining a beam direction of a reference signal according to an embodiment of this application.

For example, FIG. 7 shows three transmission resources used to transmit an SRS, where 0, 1, 2, and 3 represent different beam directions. In three adjacent slots, beam directions of the SRS on four symbols are as follows:

the first slot: 0, 1, 2, 3 the second slot: 1, 2, 3, 0 the third slot: 2, 3, 0, 1

In each of the three transmission resources, a beam direction of the SRS on each symbol varies, and a beam direction of the SRS at a same symbol location also varies with different transmission resources. The SRS is transmitted, based on a specific cycle or at a specific interval, on the four transmission symbols of the SRS.

A benefit of this transmission manner is as follows: When the transmission resource used by the first device to send the reference signal may collide with a transmission resource used by the first device to send another message, if skipping sending a part of the reference signal is required, assuming that a part of the reference signal on last two of the four symbols is unsent in each slot, a beam direction of a part of the reference signal received by a second device in a plurality of slots is still relatively complete, thereby improving transmission quality.

For example, in FIG. 7, it is assumed that the reference signal on last two symbols is unsent in any of the three slots. Then beam directions of the reference signal received by the second device are 0 and 1 (in the first slot), 1 and 2 (in the second slot), and 2 and 3 (in the third slot). In this way, each beam direction has been received.

The following describes how the first device determines, from the slot and based on the time domain resource parameter and the predefined mode, the beam direction of each symbol in the transmission resource used to transmit the reference signal. This embodiment of this application provides three optional manners.

Manner 1:

When the time domain resource parameter of the reference signal is a time domain resource index, the first device may determine, from the slot and based on the time domain resource index of the reference signal and a specific step, the beam direction of each symbol in the transmission resource used to transmit the reference signal. This may be implemented through calculation by using Formula 7:

$$Bx=(Ni*\Delta)\bmod L \quad \text{(Formula 7)}$$

where Bx represents a beam index of the reference signal, Ni is the time domain resource index, $\Delta$ is the specific step, mod represents a modulo operation, and L is a maximum quantity of supported or configured beam directions.

Manner 2:

When the time domain resource parameter of the reference signal is a time domain resource index and the reference signal needs to be sent at a cycle, the first device may determine, from the slot and based on the time domain resource index of the reference signal, a specific step, and the cycle, the beam direction of each symbol in the transmission resource used to transmit the reference signal. This may be implemented through calculation by using Formula 8:

$$Bx=(Bx0+T*\Delta)\bmod L \quad \text{(Formula 8)}$$

where Bx0 represents a beam index in last sending of the reference signal, and T is the cycle at which the reference signal is sent.

Manner 3:

It should be noted that, in a scenario in which the first device is located in a communications cell, the first device may alternatively determine, from the slot and the transmission resource set and based on the time domain resource parameter and a first parameter, the beam direction of each symbol in the transmission resource used to transmit the reference signal, where the first parameter includes any one of or a combination of more than one of a carrier identifier, a bandwidth part identifier, a cell identifier, a beam identifier, and a subcarrier spacing. Usage of a combination of a plurality of parameters during the determining of the beam direction is the same as the manner and principle of usage in the foregoing second implementation, and descriptions are not repeatedly enumerated herein.

When the time domain resource parameter of the reference signal is a time domain resource index, the first device may determine, based on the time domain resource index of the reference signal, a specific step, and the first parameter, locations of the N symbols used to transmit the reference signal in the M symbols of the transmission resource set. This may be implemented through calculation by using Formula 9 or Formula 10:

$$Bx=(Ni*\Delta+a)\bmod L \quad \text{(Formula 9)}$$

$$Bx=(Ni*\Delta+a+b)\bmod L \quad \text{(Formula 10)}$$

where a and b are any one of the first parameter.

In this way, the information about the transmission resource used to transmit the reference signal is determined from the transmission resource set by using the first parameter related to a communications cell, and the determined transmission resource can better comply with a communications characteristic of the cell, so that the first device can more properly transmit the reference signal in the cell, thereby improving transmission efficiency.

Embodiment 2

Based on the descriptions of Embodiment 1, it is clarified that, in an embodiment of this application, a transmission resource for transmitting a reference signal may be dynamically determined based on a time domain resource parameter of the reference signal, to reduce a probability of colliding with sending of another message during sending of the reference signal, thereby improving system transmission efficiency.

This embodiment mainly describes how the first device performs processing when the transmission resource used to transmit the reference signal collides with a transmission resource used to transmit a message, so as to reduce impact on transmission performance.

It should be noted that, this embodiment may be separately implemented, or may be implemented based on Embodiment 1.

Figure 8:
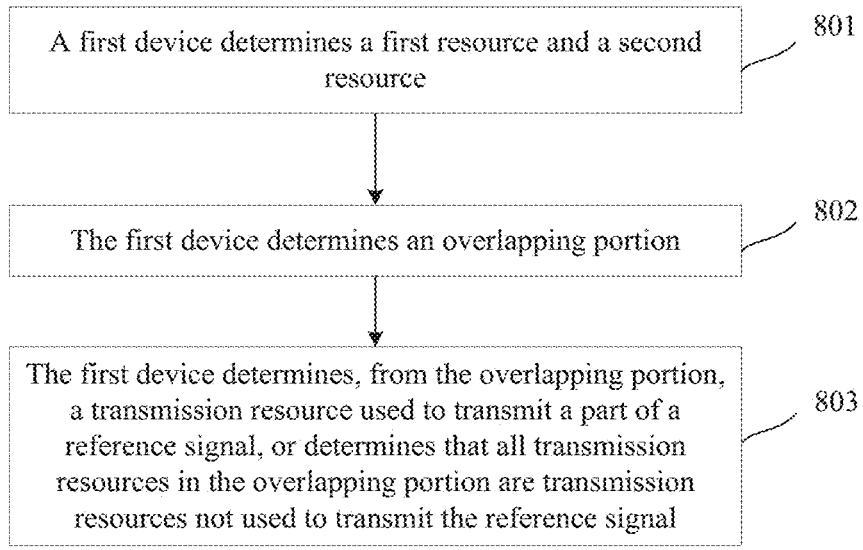
FIG. 8 is a flowchart of a method for determining a transmission resource of a reference signal according to an embodiment of this application.

FIG. 8 is a flowchart of a method for determining a transmission resource of a reference signal according to this embodiment of this application. The method includes the following steps.

801. A first device determines a first resource and a second resource.

802. The first device determines an overlapping portion, where the overlapping portion includes a time domain portion that is in the first resource and that overlaps with the second resource.

Both the first resource and the second resource are transmission resources. The transmission resource includes any one of or a combination of more than one of a time domain resource, a frequency domain resource, a code domain resource, and a space domain resource. The first resource is a transmission resource used to transmit a to-be-sent reference signal, and the second resource is a transmission resource used to transmit a to-be-sent message. The reference signal may include different types of reference signals, for example, a periodic reference signal, an aperiodic reference signal, a semi-persistent reference signal, or a reference signal used to capture channel state information. In addition, the reference signal may be specifically an SRS, a DMRS, a random access reference signal, a phase tracking reference signal, a channel state information-reference signal, a positioning reference signal, or the like. The information may include data and control information. Specifically, the message may further include one or more of a hybrid automatic repeat request (HARQ) response message, scheduling request information, beam failure request information, and the like.

The first resource and the second resource may be located in a same slot or same some consecutive slots. Because a reference signal needs to be transmitted on the first resource, when the first resource overlaps with the second resource in time domain, the first device needs to determine how to perform processing, so as to prevent a collision between the first resource and the second resource from affecting transmission performance of the first device.

The first device may determine, in different manners, whether the first resource overlaps with the second resource. For example, the first device may determine, based on a time domain location of the first resource and a slot location of the second resource, whether the first resource overlaps with the second resource.

There may be a plurality of cases in which the first resource has a portion that overlaps with the second resource. In this embodiment, four cases of overlapping are described as examples.

Figure 9A:
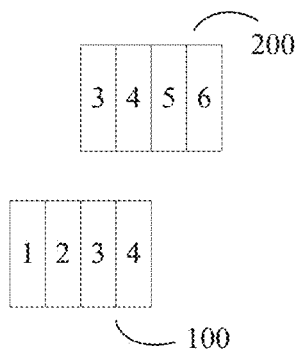
FIG. 9a is a schematic diagram of a resource overlapping case according to an embodiment of this application.

First Case of Overlapping:

Some symbols of the first resource overlap with some symbols of the second resource in terms of time domain locations. This case may be shown in FIG. 9a. A first resource 100 occupies four symbols: symbols 1 to 4, where the four symbols are transmission resources used to transmit a reference signal. A second resource 200 occupies four symbols: symbols 3 to 6, where the four symbols are transmission resources used to transmit a message. Some symbols of the first resource 100 overlap with some symbols of the second resource 200 in terms of time domain locations at which the symbols 3 and 4 are located. The overlapping portion, namely, the time domain portion that is in the first resource and that overlaps with the second resource, may be the symbols 3 and 4 of the first resource 100.

Figure 9B:
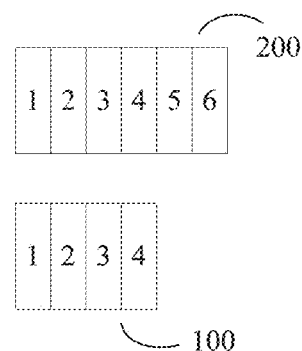
FIG. 9b is a schematic diagram of a resource overlapping case according to an embodiment of this application.

Second Case of Overlapping:

All symbols of the first resource overlap with some symbols of the second resource in terms of time domain locations. This case may be shown in FIG. 9b. A first resource 100 occupies four symbols: symbols 1 to 4, where the four symbols are transmission resources used to transmit a reference signal. A second resource 200 occupies six symbols: symbols 1 to 6, where the six symbols are transmission resources used to transmit a message. All symbols of the first resource 100 overlap with some symbols of the second resource 200 in terms of time domain locations at which the symbols 1 to 4 are located. The overlapping portion, namely, the time domain portion that is in the first resource and that overlaps with the second resource, may be the symbols 1 to 4 of the first resource 100.

Figure 9C:
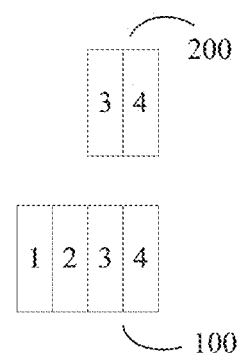
FIG. 9c is a schematic diagram of a resource overlapping case according to an embodiment of this application.

Third Case of Overlapping:

Some symbols of the first resource overlap with all symbols of the second resource in terms of time domain locations. This case may be shown in FIG. 9c. A first resource 100 occupies four symbols: symbols 1 to 4, where the four symbols are transmission resources used to transmit a reference signal. A second resource 200 occupies two symbols: symbols 3 and 4, where the two symbols are transmission resources used to transmit a message. Some symbols of the first resource 100 overlap with all symbols of the second resource 200 in terms of time domain locations at which the symbols 3 and 4 are located. The overlapping portion, namely, the time domain portion that is in the first resource and that overlaps with the second resource, may be the symbols 3 and 4 of the first resource 100.

Figure 9D:
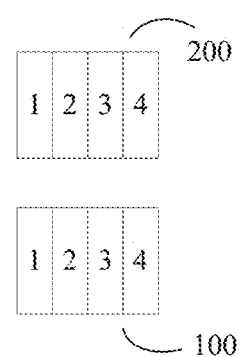
FIG. 9d is a schematic diagram of a resource overlapping case according to an embodiment of this application.

Fourth Case of Overlapping:

All symbols of the first resource overlap with all symbols of the second resource in terms of time domain locations. This case may be shown in FIG. 9d. A first resource 100 occupies four symbols: symbols 1 to 4, where the four symbols are transmission resources used to transmit a reference signal. A second resource 200 occupies four symbols: symbols 1 to 4, where the four symbols are transmission resources used to transmit a message. All symbols of the first resource 100 overlap with all symbols of the second resource 200 in terms of time domain locations at which the symbols 1 to 4 are located. The overlapping portion, namely, the time domain portion that is in the first resource and that overlaps with the second resource, may be the symbols 1 to 4 of the first resource 100.

In the foregoing four cases of overlapping, the first resource and the second resource may be located in a same slot. In FIG. 9a to FIG. 9d, a direction of a horizontal axis (a y axis) may be a time domain direction, and a direction of a vertical axis (an x axis) may be a frequency domain direction.

803. The first device determines, from the overlapping portion, a transmission resource used to transmit a part of the reference signal, or determines that all transmission resources in the overlapping portion are transmission resources not used to transmit the reference signal.

When the first device determines that the first resource has a time domain portion that overlaps with the second resource, the first device may process a reference signal transmitted in the overlapping portion of the first resource, so as to alleviate or resolve a problem of a collision between a transmission resource used to transmit a reference signal and a transmission resource used to transmit a message, thereby improving transmission performance of the first device.

When the first device determines that all the transmission resources in the overlapping portion are transmission resources not used to transmit the reference signal, the first device may further send, by using the first resource, a reference signal that is in the first resource and that is not located in the overlapping portion, thereby avoiding a case in which a second device obtains, in a slot in which the first resource is located, none of the reference signal by using the first resource.

After step 803 is performed, in a cellular link scenario, the first device may further send indication information to a base station, where the indication information is used to indicate the determined transmission resource used to transmit a part of the reference signal in the overlapping portion; or used to indicate that all the transmission resources in the overlapping portion are transmission resources not used to transmit the reference signal; or used to indicate that all transmission resources in the first resource are transmission resources not used to transmit the reference signal. With the indication information, processing performed by the first device on the reference signal can be synchronized to the base station, to avoid system chaos.

In this embodiment, at least two manners of processing the reference signal are provided for step 803. A first processing manner is that the first device determines, from the overlapping portion, a transmission resource used to transmit a part of the reference signal. A second processing manner is that the first device determines that all the transmission resources in the overlapping portion are transmission resources not used to transmit the reference signal. The following describes the two processing manners.

First Processing Manner:

In this processing manner, the first device determines, from the overlapping portion, a transmission resource used to transmit a part of the reference signal. Herein, the transmission resource used to transmit a part of the reference signal may be understood as discarding only a part of the reference signal in the overlapping portion but not the entire reference signal. In other words, a part of the reference signal in the overlapping portion is still kept for transmission. In this way, a benefit is as follows: Although a collision still exists to some extent when the first device performs transmission in the time domain portion that is in the first resource and that overlaps with the second resource, the second device, namely, a device to receive content transmitted by the first device, can receive a part of the reference signal in the time domain overlapping portion, thereby avoiding a failure to implement some functions or fulfill some communication requirements when none of the reference signal is received. Furthermore, because there is a relatively small quantity of reference signals in the time domain overlapping portion, transmit power needed for the first device to perform transmission in the time domain portion that is in the first resource and that overlaps with the second resource is also reduced, to alleviate the caused collision to some extent, so that impact on transmission performance is relatively minor.

In this processing manner, the first device may skip sending a reference signal on some symbols in the overlapping portion. For example, in a scenario shown in FIG. 9*a*, the first device determines that a symbol 3 in a first resource 100 is a transmission resource used to transmit a reference signal, and skips sending a reference signal that originally should be located on a symbol 4. Alternatively, the first device may skip sending some or all of space domain resources on a symbol in the overlapping portion. For example, in a scenario shown in FIG. 9*a*, the first device determines that symbols 3 and 4 in a first resource 100 are transmission resources used to transmit a reference signal, but skips sending some or all of space domain resources on the symbols 3 and 4 in the first resource 100 or may skip sending some or all of space domain resources on the symbol 3 in the first resource 100; or may skip sending some or all of space domain resources on the symbol 4 in the first resource 100.

In this processing manner, the transmission resource used to transmit a part of the reference signal may be predefined, or configured by using signaling.

In this embodiment of this application, an implementation concerning how the first device skips sending the reference signal on some symbols in the overlapping portion is not limited. For example, the first device may discard a reference signal that does not need to be sent and that is located on some symbols in the overlapping portion.

Second Processing Manner:

In this processing manner, the first device determines that all transmission resources in the overlapping portion are transmission resources not used to transmit the reference signal. To be specific, the first device skips sending any reference signal originally located in the overlapping portion, and none of the transmission resources in the overlapping portion are used to transmit a reference signal.

In this way, a benefit is as follows: A collision does not occur when the first device performs transmission in the time domain portion that is in the first resource and that overlaps with the second resource, so that transmission performance of the first device is desirably improved, and this processing manner is easy to implement for the first device. For example, in a scenario shown in FIG. 9*a*, the first device may skip sending any reference signal originally located on symbols 3 and 4 of a first resource 100.

In this embodiment of this application, an implementation concerning how the first device skips sending any reference signal originally located in the overlapping portion is not limited. For example, the first device may discard all reference signals that do not need to be sent and that are originally located in the overlapping portion.

This embodiment further provides two other processing manners for step 803, in addition to the foregoing two processing manners.

Third Processing Manner:

In this processing manner, the first device determines, from the first resource, a transmission resource used to transmit a part of the reference signal.

This processing manner is similar to the first processing manner, and a difference mainly lies in a processing scope. In this processing manner, the first device not only needs to determine a transmission resource used to transmit a part of the reference signal in the overlapping portion, but also needs to process a transmission resource that is used to transmit a part of the reference signal in the first resource and that is not located in the overlapping portion. In other words, the first device focuses on reference signals in the entire first resource. For example, in a scenario shown in FIG. 9*a*, the first device may skip sending a part of a reference signal originally located on symbols 1 to 4 of a first resource 100.

Fourth Processing Manner:

In this processing manner, the first device determines that all transmission resources in the first resource are transmission resources not used to transmit the reference signal.

This processing manner is similar to the second processing manner, and a difference mainly lies in a processing scope. In this processing manner, the first device not only needs to determine that all transmission resources in the overlapping portion are transmission resources not used to transmit the reference signal, but also needs to process, as transmission resources not used to transmit the reference signal, all transmission resources that are of the first resource and that are not in the overlapping portion. In other words, the first device focuses on reference signals in the entire first resource. For example, in a scenario shown in FIG. 9*a*, the first device may skip sending any reference signal originally located on symbols 1 to 4 of a first resource 100.

It should be noted that, for step 803, this embodiment of this application does not impose a limitation such that there can be only the foregoing four processing manners. There may be another processing manner.

After describing the foregoing four processing manners, this embodiment describes possible implementations of the foregoing processing manners based on different application scenarios, triggering conditions, or the like. The following describes eight possible implementations. However, this embodiment of this application does not impose a limitation such that there can be only the eight implementations. There may be another implementation.

It should be noted that, this does not mean that the foregoing processing manners can be implemented only by using the following implementations. Alternatively, the first device may directly implement the foregoing processing manners.

First Implementation:

This implementation is mainly used to implement the second processing manner and the fourth processing manner; or certainly may be used to implement the first processing manner and the third processing manner.

In this implementation, the first device may determine a case of overlapping between the first resource and the second resource. If some symbols of the first resource overlap with some symbols of the second resource in terms of time domain locations or if some symbols of the first resource overlap with all symbols of the second resource in terms of time domain locations, the first device may determine, from the first resource, a transmission resource used to transmit a part of the reference signal, or the first device may determine that all transmission resources in the first resource are transmission resources not used to transmit the reference signal.

In other words, the first device may determine to implement the foregoing processing manners when the first resource partially overlaps with the second resource. However, it should be noted that, this embodiment of this application does not impose a limitation such that the second processing manner and the fourth processing manner can be implemented only under this overlapping condition. Alternatively, the first device may directly implement the second processing manner and the fourth processing manner.

Second Implementation:

This implementation is mainly used to implement the foregoing four processing manners.

In this implementation, the first device may determine, based on an indication in indication information, to implement one of the foregoing processing manners.

To be specific, the first device determines, from the overlapping portion and based on indication information, a transmission resource used to transmit a part of the reference signal, or determines that all the transmission resources in the overlapping portion are transmission resources not used to transmit the reference signal.

In addition, the first device may alternatively determine, from the first resource and based on indication information, a transmission resource used to transmit a part of the reference signal; or determine that all the transmission resources in the first resource are transmission resources not used to transmit the reference signal.

The indication information may be predefined, or configured by using signaling. For example, in a cellular link scenario, if the first device is UE, the indication information may be configured by a base station for the UE by using signaling.

Optionally, the indication information may be used to instruct the first device to determine, from the overlapping portion, a transmission resource used to transmit a part of the reference signal; or the indication information may be used to instruct the first device to determine that all the transmission resources in the overlapping portion are transmission resources not used to transmit the reference signal; or the indication information may be used to instruct the first device to determine that all the transmission resources in the first resource are transmission resources not used to transmit the reference signal.

Optionally, the indication information may instruct, by using different values, the first device to implement different processing manners. For example, when the indication information is a first value, the indication information may be used to instruct the first device to implement the first processing manner, or when the indication information is a second value, the indication information may be used to instruct the first device to implement the second processing manner.

The indication in the indication information can clearly instruct the first device to implement a particular processing manner.

Third Implementation:

This implementation is mainly used to implement the foregoing four processing manners.

In this implementation, the first device may determine, based on a quantity of symbols of the first resource in the overlapping portion, to implement a particular manner.

To be specific, the first device may determine, from the overlapping portion and based on a quantity of symbols included in the overlapping portion, a transmission resource used to transmit a part of the reference signal, or determine that all the transmission resources in the overlapping portion are transmission resources not used to transmit the reference signal, or determine that all the transmission resources in the first resource are transmission resources not used to transmit the reference signal.

This implementation does not impose a limitation on how the first device implements a particular processing manner based on the quantity of symbols included in the overlapping portion. For example, the first device may determine to implement a particular processing manner based on the quantity of symbols included in the overlapping portion.

In an optional solution of determining to implement a particular processing manner based on the quantity of symbols, the first device may determine the quantity of symbols included in the overlapping portion. If the quantity of symbols included in the overlapping portion is less than or equal to a preset quantity, the first device determines, from the overlapping portion, a transmission resource used to transmit a part of the reference signal, or determines that all the transmission resources in the overlapping portion are transmission resources not used to transmit the reference signal.

If the quantity of symbols included in the overlapping portion is greater than the preset quantity, the first device determines that all the transmission resources in the first resource are transmission resources not used to transmit the reference signal.

The preset quantity may be set in advance, or may be determined based on a total quantity of symbols in the first resource, for example, may be 50% of the total quantity of symbols in the first resource. When the symbols in the overlapping portion are relatively substantial and account for a relatively high proportion to the total quantity of symbols in the first resource, if transmission of a remaining part of the reference signal is probably of little significance to the second device or useless for the second device, the entire reference signal may not be transmitted, so as to save a transmission resource of the first device.

Fourth Implementation:

This implementation is mainly used to implement the foregoing four processing manners.

In this implementation, the first device may mainly focus on and process a space domain resource in a transmission resource. Herein, the space domain resource may include a beam direction of a beam used to transmit the reference signal, or a preceding parameter for use when the reference signal is transmitted by using a plurality of antennas.

Specifically, the first device determines, from the overlapping portion, some space domain resources used to transmit a part of the reference signal, or determines that all space domain resources in the overlapping portion are space domain resources not used to transmit the reference signal.

When the space domain resource is in a beam manner, for implementation of the first processing manner and the third processing manner, the first device may perform different processing on an unsent beam direction.

For example, for the first processing manner, in some space domain resources used to transmit a part of the reference signal, a beam direction that is unsent by the first device and that is of the reference signal located on a first symbol is the same as or different from a beam direction that is unsent by the first device and that is of the reference signal located on a second symbol, where the first symbol and the second symbol are symbols in the overlapping portion.

For example, for the third processing manner, in a partial space domain resource, all of which is used to transmit the reference signal, in the first resource, a beam direction that is unsent by the first device and that is of the reference signal located on a third symbol is the same as or different from a beam direction that is unsent by the first device and that is of the reference signal located on a fourth symbol, where the third symbol and the fourth symbol are symbols in the first resource.

Figure 10:
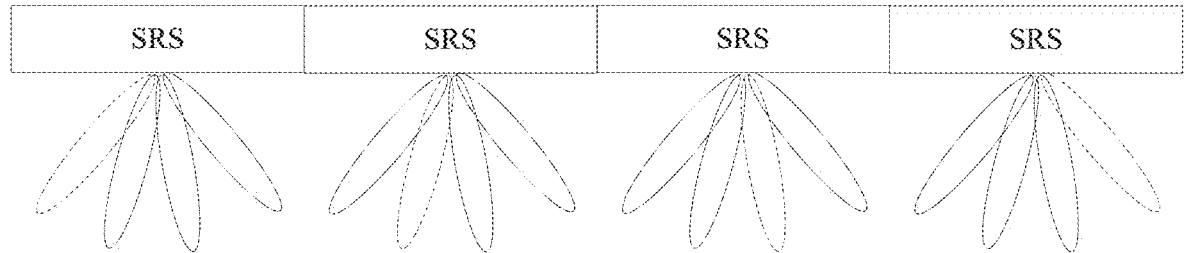
FIG. 10 is a schematic diagram of determining a space domain resource of a reference signal according to an embodiment of this application.

For example, an unsent beam direction in a third symbol and an unsent beam direction in a fourth symbol are different. As shown in FIG. 10, a reference signal in a first resource is an SRS, and the first resource has four symbols. In each symbol, the SRS has four different beam directions. In this implementation, the first device may skip sending some beam directions of each symbol in the first resource. For example, a beam direction indicated by a dotted line in FIG. 10 may be a beam direction unsent by the first device. It can be learned that, an unsent beam direction of the four symbols each varies.

A benefit of this implementation is as follows: First, transmit power of the first device during transmission with the first resource is reduced; second, although some beam directions are missing when the second device receives the reference signal sent by using the first resource, beam directions of the reference signal that are carried by the four symbols are still relatively complete, and probably each direction is present, thereby improving a probability of implementing a function or fulfilling a communication requirement by the second device based on the reference signal.

Fifth Implementation:

This implementation is mainly used to implement the first processing manner.

In this implementation, a plurality of reference signals may be transmitted in the first resource, and therefore a plurality of reference signals may be included in the overlapping portion. In this case, the first device may determine, based on priorities of the plurality of reference signals in the overlapping portion, to skip sending a particular reference signal.

To be specific, the first device determines the priorities of the plurality of reference signals located in the overlapping portion.

The first device determines, from the overlapping portion, a transmission resource used to transmit some reference signals whose priorities are relatively high in the plurality of reference signals, or determines that all the transmission resources in the overlapping portion are transmission resources not used to transmit at least one reference signal whose priority is relatively low in the plurality of reference signals.

Generally, a reference signal whose priority is relatively high is more important than a reference signal whose priority is relatively low, that is, brings a greater negative effect if not sent. Therefore, the first device may preferentially send a reference signal whose priority is relatively high, and skip sending a reference signal whose priority is relatively low, thereby improving transmission efficiency of the first device.

Herein, the priority of a reference signal may be preset, or may be determined based on a type or importance of the reference signal. For example, a priority of an aperiodic reference signal is higher than that of a semi-persistent reference signal; and a priority of a semi-persistent reference signal is higher than that of a periodic reference signal.

Sixth Implementation:

This implementation is mainly used to implement the foregoing four processing manners.

An application scenario of this implementation is a frequency division multiplexing scenario. A plurality of reference signals in the first resource occupy M parallel frequency domain resources, where the frequency domain resource may include a carrier, a bandwidth part, a subband, or the like.

Correspondingly, during implementation of the foregoing processing manners, the first device determines, from N parallel frequency domain resources located in the overlapping portion, a frequency domain resource used to transmit a part of the reference signal, or determines that the N parallel frequency domain resources located in the overlapping portion are frequency domain resources not used to transmit the reference signal, where the N frequency domain resources are a subset of the M parallel frequency domain resources.

In other words, when the first resource has M parallel frequency domain resources, the first device mainly focuses on and processes a reference signal in the N frequency domain resources. In the N parallel frequency domain resources, each frequency domain resource may come from a same configured reference signal, or come from reference signals in a same frequency hopping mode.

The first device may determine, according to a preset manner, the N parallel frequency domain resources from the M parallel frequency domain resources; or may determine, in a random selection manner, the N parallel frequency domain resources from the M parallel frequency domain resources; or may determine, based on a first parameter, at least one of the N parallel frequency domain resources from the M parallel frequency domain resources. The first parameter may include any one of or a combination of more than one of the following parameters:

indication information of a time domain or frequency domain resource of downlink control information for scheduling the first device; a bandwidth part identifier; a carrier identifier; an identifier of the first device; an identifier of a cell in which the first device is located; a space domain resource identifier; an identifier of a slot in which the first resource is located; and an identifier of a reference signal.

Figure 11:
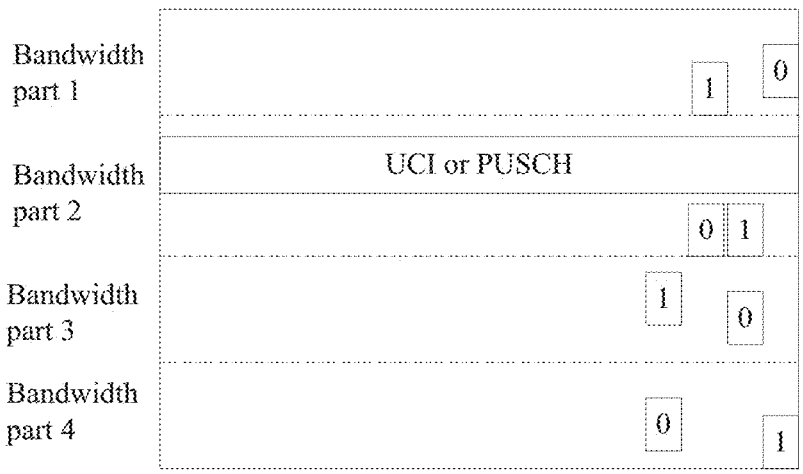
FIG. 11 is a schematic diagram of a reference signal in a scenario of parallel frequency domain resources according to an embodiment of this application.

The following describes this implementation with reference to an accompanying drawing. As shown in FIG. 11, M=4, N=2, and a first resource has four parallel bandwidth parts. A bandwidth part 2 is used to transmit information, for example, UCI or physical uplink control channel (PUCCH) data, or physical uplink shared channel (PUSCH) data. In each of a bandwidth part 1, a bandwidth part 3, and a bandwidth part 4, there is a reference signal from a reference signal source 0, and a reference signal from a reference signal source 1. It is assumed that two parallel bandwidth parts determined by the first device from the four bandwidth parts are the bandwidth part 1 and the bandwidth part 3. Then the first device may skip sending some or all of reference signals in the bandwidth part 1 and the bandwidth part 3, for example, may skip sending all the reference signals in the bandwidth part 1 and the bandwidth part 3; or may skip sending the reference signal from the reference signal source 1 in the bandwidth part 1 and the bandwidth part 3.

Seventh Implementation:

This implementation is mainly used to implement the foregoing four processing manners.

An application scenario of this implementation is similar to that of the sixth implementation. Details are not described herein again.

In this implementation, the first device may determine that all frequency domain resources in the overlapping portion are frequency domain resources not used to transmit a specific type of reference signal. The specific type may be preset or may be configured by using signaling. The specific type of reference signal may include a reference signal whose importance is relatively low, such as a periodic reference signal or a semi-persistent reference signal.

FIG. 11 is used as an example. It is assumed that, reference signals of a reference signal source 1 belong to a specific type of reference signal, and the first device may determine that all frequency domain resources in the overlapping portion are frequency domain resources not used to transmit the reference signals from the reference signal source 1, but may be used to transmit only a reference signal from a reference signal source 0. The first device may transmit a relatively important reference signal while ensuring, as much as possible, minor impact on transmission performance of the first device, thereby improving transmission efficiency of the first device.

Eighth Implementation:

This implementation is mainly used to implement the foregoing four processing manners.

In this implementation, the first device may determine, based on transmit power used to transmit a symbol in the overlapping portion, whether to implement the foregoing processing manners.

If transmit power used by the first device to transmit a symbol in the overlapping portion exceeds predefined power, the first device may determine, from the overlapping portion, a transmission resource used to transmit a part of the reference signal, or determine that all transmission resources in the overlapping portion are transmission resources not used to transmit the reference signal.

Because a factor affecting transmission performance of the first device lies in the transmit power, when a volume of data that needs to be transmitted during transmission increases, transmit power needed during the transmission increases, affecting the transmission performance. A relatively large volume of data, for example, a reference signal in the first resource and information in the second resource, may be included in the overlapping portion that is of the first resource and that overlaps with the second resource. When performing transmission by using a symbol in the overlapping portion, the first device uses higher transmit power. Therefore, the first device may determine, based on the predefined power, whether required transmit power is excessively high. When the required transmit power is excessively high, the first device may implement the foregoing four processing manners, to reduce the transmit power by skipping sending a part of the reference signal or the entire reference signal, thereby improving transmission performance.

Ninth Implementation:

This implementation is mainly used to implement the foregoing four processing manners.

In this implementation, the first device may determine whether a priority of a reference signal in the overlapping portion is higher or lower than a priority of information in a time domain portion that is in the second resource and that overlaps with the first resource, to determine whether to implement the foregoing processing manners.

The first device obtains a priority of a reference signal in the overlapping portion and a priority of a first message, where the first message is located in a time domain portion that is in the second resource and that overlaps with the first resource.

If the priority of the reference signal in the overlapping portion is lower than the priority of the first message, the first device determines, from the overlapping portion, a transmission resource used to transmit a part of the reference signal, or determines that all transmission resources in the overlapping portion are transmission resources not used to transmit the reference signal.

In other words, the first device implements the foregoing processing manners only when the priority of the reference signal is lower than the priority of the first message. When the priority of the reference signal is higher, the first device may not implement the foregoing processing manners for the reference signal.

The first message includes an urgent message and a non-urgent message, where the urgent message includes a HARQ response message, scheduling request information, or beam failure request information; and the non-urgent message is a message other than the urgent message.

The first device may determine whether the priority of the reference signal in the overlapping portion is higher or lower than the priority of the first message in the following manner:

a priority of an urgent message is higher than the priority of the reference signal; and when the reference signal is an aperiodic reference signal, the priority of the reference signal is higher than a priority of a non-urgent message; or when the reference signal is a semi-persistent reference signal, the priority of the reference signal is higher than a priority of a non-urgent message.

In this way, a comparison is made between the priority of the reference signal and a priority of information, to avoid a case in which an important reference signal is unsent when the reference signal on the transmission resource collides with the information. In addition, when a collision occurs, more possible processing manners are provided by introducing the priority of the reference signal and the priority of the information. For example, when the priority of the reference signal is higher than that of the first message, the first device may not perform the processing of skipping sending a part of the reference signal or the entire reference signal. The first device may even process the first message, to skip sending a part of the message or the entire message. With more possible processing manners, when the transmission resource used by the first device to send the reference signal collides with a transmission resource used by the first device to send another message, the first device may select a processing manner that is more suitable for a scenario to perform processing based on different application scenarios, thereby improving transmission reliability.

Embodiment 3

With reference to the ninth implementation in Embodiment 2, this embodiment describes a condition in which the first device may select, when a transmission resource used to send a reference signal collides with a transmission resource used by the first device to send another message, a processing manner of skipping sending a part of the message or the entire message.

Figure 12:
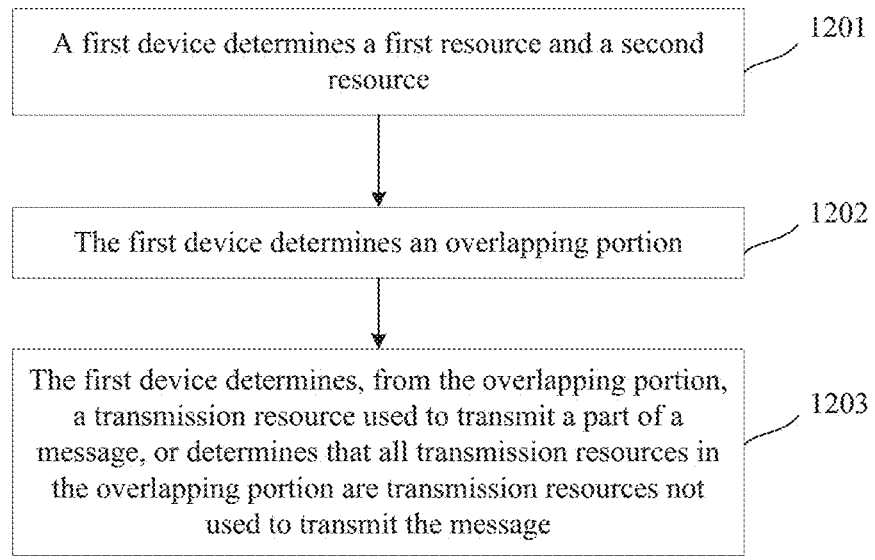
FIG. 12 is a flowchart of a method for determining a transmission resource of a message according to an embodiment of this application.

FIG. 12 is a flowchart of a method for determining a transmission resource of a message according to this embodiment of this application. The method includes the following steps.

1201. A first device determines a first resource and a second resource, where the first resource is a transmission resource used to transmit a to-be-sent reference signal, and the second resource is a transmission resource used to transmit a to-be-sent message.

For related descriptions of each feature in this step, refer to descriptions in a corresponding part of Embodiment 2. Details are not described herein again.

1202. The first device determines an overlapping portion.

It should be noted that the overlapping portion determined in this embodiment is different from the overlapping portion determined in Embodiment 2. Because this embodiment mainly focuses on descriptions of how to process information when there is a time domain overlapping portion, the overlapping portion in this embodiment includes a time domain portion that is in the second resource and that overlaps with the first resource. For example, in FIG. 9a, the overlapping portion may be symbols 3 and 4 in a second resource 200.

For a relationship of overlapping between the first resource and the second resource, refer to descriptions of a corresponding part in Embodiment 2. Details are not described herein again.

1203. The first device determines, from the overlapping portion, a transmission resource used to transmit a part of the message, or determines that all transmission resources in the overlapping portion are transmission resources not used to transmit the message.

For processing of the message in the overlapping portion by the first device in this step, refer to the processing of the reference signal in the overlapping portion by the first device in Embodiment 2. For example, refer to the four processing manners in Embodiment 2. These processing manners each may be used by the first device to process the message in this embodiment.

It should be noted that, this embodiment may further include a scenario of a plurality of parallel frequency domain resources, where the message and the reference signal may be located in a same carrier, or located in different bandwidth parts of a same carrier, or located in a same bandwidth part of a same carrier; and the reference signal is located in a time domain portion that is in the first resource and that overlaps with the second resource.

When the first device determines that the first resource has a time domain portion that overlaps with the second resource, the first device may process a message transmitted in the overlapping portion of the second resource, so as to alleviate or resolve a problem of a collision between a transmission resource used to transmit a reference signal and a transmission resource used to transmit a message, thereby improving transmission performance of the first device.

Before performing step 1203, the first device may determine a priority of a message in the overlapping portion and a priority of a reference signal located in a time domain portion that is in the first resource and that overlaps with the second resource; and if the priority of the reference signal is higher than the priority of the message, the first device determines, from the overlapping portion, a transmission resource used to transmit a part of the message, or determines that all transmission resources in the overlapping portion are transmission resources not used to transmit the message.

The message includes an urgent message and a non-urgent message. The urgent message includes a HARQ response message, scheduling request information, or beam failure request information. The non-urgent message is a message other than the urgent message.

The first device determines whether the priority of the reference signal is higher or lower than the priority of the message in the following manner:

a priority of an urgent message is higher than the priority of the reference signal; and when the reference signal is an aperiodic reference signal, the priority of the reference signal is higher than a priority of a non-urgent message; or when the reference signal is a semi-persistent reference signal, the priority of the reference signal is higher than a priority of a non-urgent message.

It should be noted that, because the message may further include a reference signal, in addition to the foregoing manner of determining the priorities, the method may further include: if the message includes a demodulation reference signal, determining, by the first device, that the priority of the reference signal is lower than the priority of the message.

In this embodiment, when a transmission resource used by the first device to send a reference signal collides with a transmission resource used by the first device to send another message, the first device may select the manner of sending only a part of the message or skipping sending the message, to alleviate or resolve the collision. This is especially applicable to the following case: The reference signal is very important when the collision occurs; and if the reference signal is not transmitted or if only a part of the reference signal is transmitted, a communication requirement that should be fulfilled cannot be fulfilled, causing system chaos or a failure to implement an important function. In this way, transmission reliability of the first device is improved.

Embodiment 4

This embodiment mainly describes a reference signal transmission method, and various manners concerning how to dynamically determine a transmission resource used to transmit a reference signal before the reference signal is transmitted. In a solution described in this embodiment, a case in which a transmission resource used by a device to transmit a reference signal collides with a transmission resource used by the device to send another message may be alternatively handled from another perspective of processing.

Figure 13:
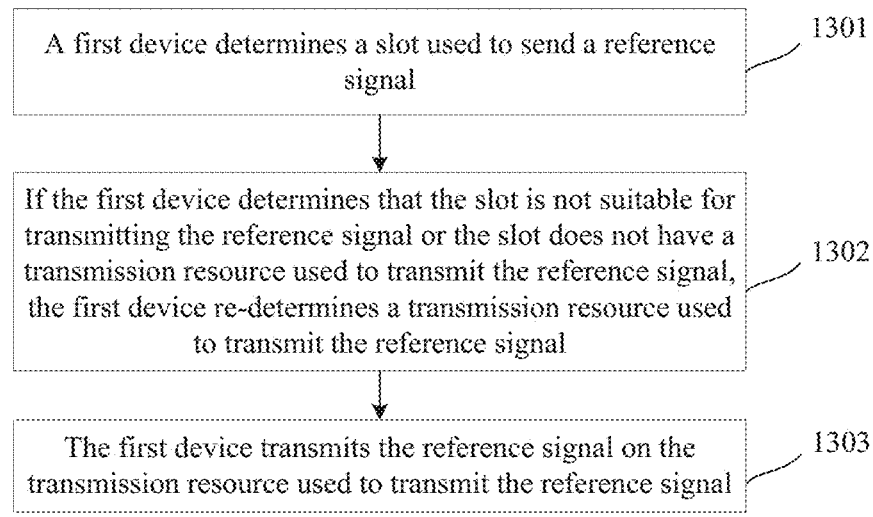
FIG. 13 is a flowchart of a reference signal transmission method according to an embodiment of this application.

FIG. 13 is a flowchart of a reference signal transmission method according to this embodiment of this application. The method includes the following steps.

1301. A first device determines a slot used to send a reference signal.

The reference signal includes any one of the following: a sounding reference signal, a demodulation reference signal, a phase tracking reference signal, a channel state information-reference signal, a random access reference signal, or a positioning reference signal.

1302. If the first device determines that the slot is not suitable for transmitting the reference signal or the slot does not have a transmission resource used to transmit the reference signal, the first device re-determines a transmission resource used to transmit the reference signal.

When the first device is ready to send the reference signal, the first device may determine a particular slot or some slots in which the reference signal should be sent. The first device may identify, based on a type of the determined slot, a purpose of a transmission resource in the slot; and may determine, based on the purpose of the transmission resource, whether the slot is suitable for transmitting the reference signal. For example, the first device finds, based on the type of the slot, that transmission resources in the slot are mainly used for reception, that is, most or all of the transmission resources are receiving resources. Apparently, a receiving resource is not suitable for transmitting, that is, not suitable for the first device to transmit the reference signal. Therefore, the first device needs to re-determine a transmission resource used to transmit the reference signal.

In this case, the determining, by a first device, a slot used to send a reference signal includes: determining, by the first device, a type of the slot, where the type of the slot is determined based on a function of the slot and/or a quantity of transmitting resources and a quantity of receiving resources in the slot.

In another case, a transmitting resource exists in the determined slot but is already occupied by another message such as data or a control message, that is, needs to be used to transmit another message. In that case, apparently, the slot does not have an idle transmission resource to transmit the reference signal, and therefore the first device also needs to re-determine a transmission resource used to transmit the reference signal.

1303. The first device transmits the reference signal on the transmission resource used to transmit the reference signal.

After re-determining the transmission resource used to transmit the reference signal, the first device may transmit the reference signal on the transmission resource.

It can be learned that, when the first device finds that a slot originally intended for transmitting the reference signal is not suitable for transmitting the reference signal or the slot does not have a transmission resource used to transmit the reference signal, the first device may not use a manner of skipping sending the reference signal but re-determines a transmission resource used to transmit the reference signal, to improve a probability of sending the reference signal. In this way, the first device makes full use of an available transmission resource of the first device to transmit the reference signal, thereby improving transmission reliability of the first device.

Furthermore, when the transmission resource used to send the reference signal collides with a transmission resource used by the device to send another message, a case of skipping sending the reference signal or skipping sending the message can also be avoided, thereby improving transmission efficiency.

For step 1302, this embodiment provides a plurality of manners of re-determining a transmission resource used to transmit the reference signal. The following describes three determining manners thereof in detail. It should be noted that, this embodiment does not impose a limitation such that only the following three determining manners can be used to re-determine a transmission resource used to transmit the reference signal. Alternatively, another determining manner may be used.

First Determining Manner:

The first device may add the transmission resource used to transmit the reference signal in the slot.

Figure 14A:
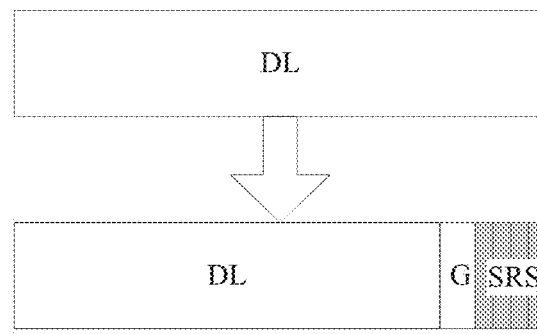
FIG. 14a is a schematic diagram of a scenario of re-determining a transmission resource of a reference signal according to an embodiment of this application.

This determining manner may be equivalent to using some original receiving resources as transmitting resources. For example, as shown in FIG. 14*a*, an upper part of FIG. 14*a* shows that all transmission resources in a slot intended for transmitting an SRS (a reference signal) are receiving resources (DL). To be able to transmit the SRS in the slot, the first device adds, to the slot, a transmission resource used to transmit the SRS. As shown in a lower part of FIG. 14*a*, some transmitting resources are added, and correspondingly, some receiving resources are removed from the slot.

Optionally, if the type of the slot is not suitable for transmitting the reference signal, the method further includes: adding, by the first device to the slot, the transmission resource used to transmit the reference signal, and setting a switching gap in a remaining transmission resource of the slot, so as to differentiate a transmitting resource from a receiving resource. For example, as shown in FIG. 14*a*, G may be the switching gap.

Figure 14B:
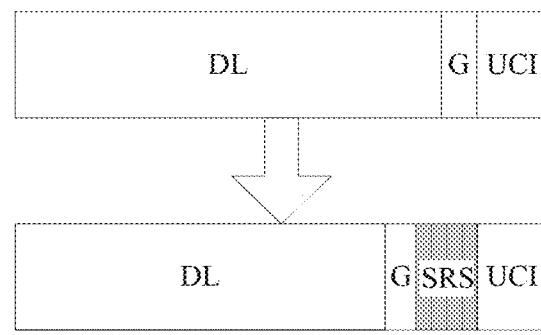
FIG. 14b is a schematic diagram of a scenario of re-determining a transmission resource of a reference signal according to an embodiment of this application.

It should be noted that, if the slot further has a transmission resource used to transmit control information, the transmission resource used to transmit the reference signal and the transmission resource used to transmit the control information may be multiplexed in a time domain adjacency manner. For example, a manner shown in FIG. 14*b* may be used. In FIG. 14*b*, a transmission resource used to transmit an SRS is added to the slot. Because the slot further has a transmission resource used to transmit UCI, and both the transmission resource used to transmit the SRS and the transmission resource used to transmit the UCI are transmitting resources, the transmitting resources are multiplexed in a time domain adjacency manner in the slot, to facilitate system management and facilitate sending by the first device and receiving by a second device.

Second Determining Manner:

The first device may switch from the slot to a slot suitable for transmitting the reference signal. Then the first device may determine, from the switched-to slot, the transmission resource used to transmit the reference signal.

Processing logic of this determining manner is similar to that of the first determining manner. However, different from the first determining manner in which only some transmission resources suitable for transmitting the reference signal are added in the slot, in the second determining manner, the type of the slot may be directly switched, to directly change, in the manner of switching the slot type, a type of a transmission resource in the slot, so that the slot has a transmitting resource that can be used to transmit the reference signal. For example, in a cellular link scenario, if a type of a slot is a downlink slot, the first device may switch the slot to an uplink slot or an uplink-dominant slot, so that after the switching, the slot has a transmitting resource, for example, an uplink transmission resource.

It should be noted that, if the slot further has a transmission resource used to transmit control information, the transmission resource used to transmit the reference signal and the transmission resource used to transmit the control information may be multiplexed in a time domain adjacency manner.

Third Determining Manner:

This determining manner may be applied to a specific scenario. In the specific scenario, there are a plurality of parallel frequency domain resources in the slot, and the frequency domain resource includes a bandwidth part, or a carrier, or a subband.

If the first device determines that the slot does not have a transmission resource used to transmit the reference signal, there may be specifically the following case: A first frequency domain resource does not have the transmission resource used to transmit the reference signal, where the first frequency domain resource is one of the plurality of frequency domain resources.

For step 1302, there may be two different determining sub-manners in this determining manner. The first device may select one of the two determining sub-manners to re-determine a transmission resource used to transmit the reference signal.

Determining sub-manner 1: The first device may determine, from a second frequency domain resource, the transmission resource used to transmit the reference signal, where the second frequency domain resource is one of the plurality of frequency domain resources.

Figure 14C:
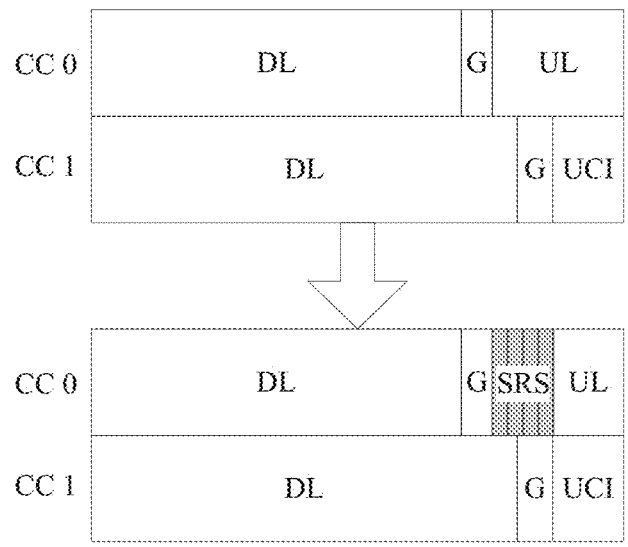
FIG. 14c is a schematic diagram of a scenario of re-determining a transmission resource of a reference signal according to an embodiment of this application.

This determining sub-manner is equivalent to determining, by the first device from another frequency domain resource, the transmission resource used to transmit the reference signal. Compared with the first frequency domain resource, the second frequency domain resource generally has a transmitting resource suitable for transmitting the reference signal, or has sufficient idle transmitting resources to transmit the reference signal. For example, as shown in FIG. 14*c*, a CC 0 may be the second frequency domain resource, and a CC 1 may be the first frequency domain resource. If the first device determines that the CC 1 does not have a transmission resource used to transmit an SRS, for example, all transmitting resources are used to transmit UCI, the first device may determine, from a transmitting resource (UL) of the CC 0, a transmission resource used to transmit the SRS.

Determining sub-manner 2: If control information is located in the first frequency domain resource, the first device may alternatively map the control information to a second frequency domain resource, and determine, from the first frequency domain resource, the transmission resource used to transmit the reference signal.

Figure 14D:
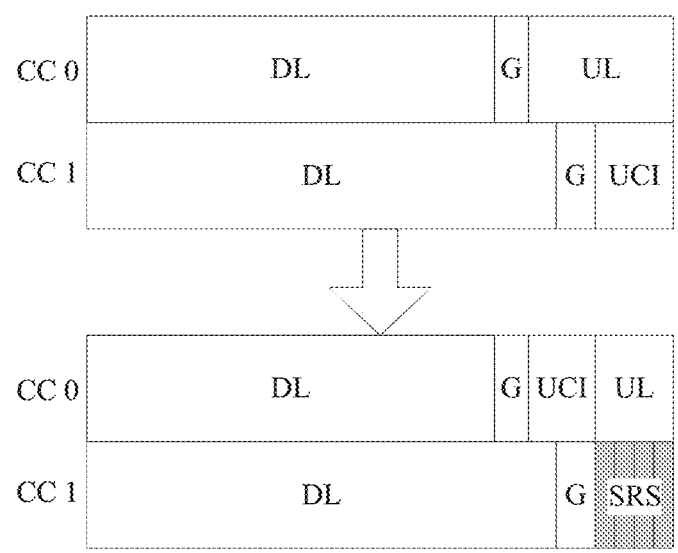
FIG. 14d is a schematic diagram of a scenario of re-determining a transmission resource of a reference signal according to an embodiment of this application.

This determining sub-manner is equivalent to moving a control signal, which is already located in a frequency domain resource intended for transmitting the reference signal, to another frequency domain resource for transmission. Because the frequency domain resource has an available transmitting resource due to the moving the control signal out of the frequency domain resource, this portion of transmitting resource may be used to transmit the reference signal. For example, as shown in FIG. 14*d*, a CC 0 may be the second frequency domain resource, and a CC 1 may be the first frequency domain resource. If the first device determines that the CC 1 does not have a transmission resource used to transmit an SRS, for example, all transmitting resources are used to transmit UCI, the first device may move the UCI out of the CC 1, map the UCI to the CC 0 for transmission, and place the SRS into a transmission resource originally used to transmit the UCI.

It should be noted that, after step 1302, that is, after the first device re-determines a transmission resource used to transmit the reference signal, in order to perform synchronization to ensure system stability, the first device may further send indication information to a base station, where the indication information is used to indicate the transmission resource re-determined by the first device to transmit the reference signal. The indication information includes: a parameter of a sequence used to transmit the reference signal, or a location of a time-frequency resource used to transmit the reference signal.

Embodiment 5

This embodiment mainly describes a reference signal transmission method, and how to configure parameter configuration information of a reference signal before the reference signal is transmitted.

Figure 15:
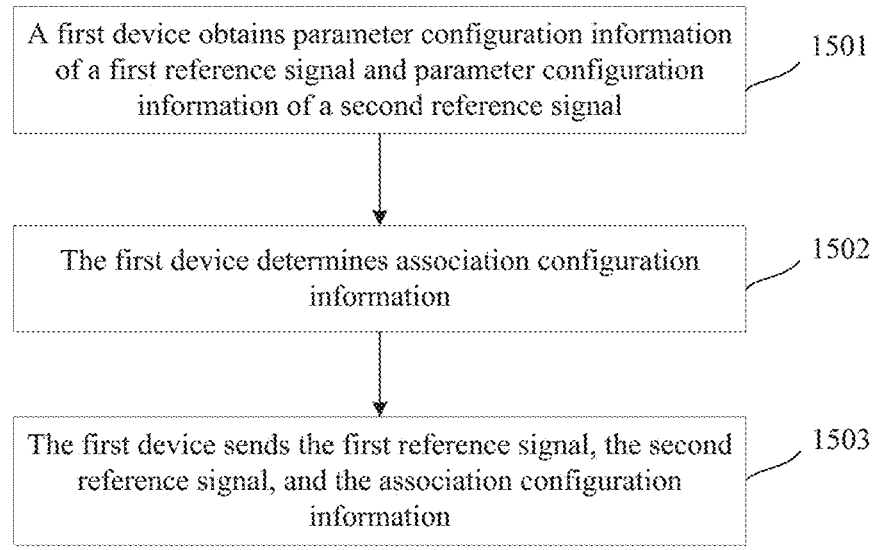
FIG. 15 is a flowchart of a reference signal transmission method according to an embodiment of this application.

FIG. 15 is a flowchart of a reference signal transmission method according to this embodiment of this application. The method includes the following steps.

1501. A first device obtains parameter configuration information of a first reference signal and parameter configuration information of a second reference signal.

The parameter configuration information of the first reference signal includes at least one of the following: a quantity N of symbols used to transmit the first reference signal, time domain locations of the N symbols of the reference signal, precoding values or beam directions used for the N time domain symbols, locations of the N time domain symbols in frequency domain, and a parameter for generating a sequence to be used for the N time domain symbols, where N is a positive integer. Likewise, content included in the parameter configuration information of the second reference signal can also be determined.

Further, optionally, the parameter for generating the sequence to be used for the N time domain symbols may further include: a root sequence number, a cyclic shift value, and an orthogonal sequence index.

1502. The first device determines association configuration information, where the association configuration information is used to determine an association relationship between the parameter configuration information of the first reference signal and the parameter configuration information of the second reference signal.

The association configuration information may include any one of or a combination of more than one of the following: indexes of time domain resources for transmitting the first reference signal and the second reference signal, a beam identifier, a subcarrier spacing identifier, a reference signal source identifier, an identifier indicating transmitter, a carrier identifier, a bandwidth part identifier, a cell identifier, and an index of a time domain or frequency domain resource in which control signaling for scheduling a reference signal is located.

1503. The first device sends the first reference signal, the second reference signal, and the association configuration information.

An association relationship between sending a first reference signal by the first device and sending a second reference signal by the first device can be reflected by using the association configuration information. After obtaining the association configuration information, a second device, namely, a device to receive the first reference signal and the second reference signal, may obtain a transmission parameter of the second reference signal through calculation based on the association configuration information upon obtaining the first reference signal. In this way, the second device can determine, based on the transmission parameter, how to accept the second reference signal, or determine the second reference signal from a message already accepted.

In this way, a benefit is as follows: When the first device needs to send the first reference signal and the second reference signal, the first device may configure only a transmission parameter of the first reference signal and may not need to configure a transmission parameter of the second reference signal, thereby reducing signaling overheads during transmission parameter configuration; and because the second device can determine the transmission parameter of the second reference signal based on the association configuration information, reception of the first reference signal and the second reference signal by the second device is not affected.

This embodiment does not impose a limitation on whether the first device needs to simultaneously send the first reference signal, the second reference signal, and the association configuration information in step 1503, and the sending may be performed successively.

Embodiment 6

This embodiment is an apparatus embodiment corresponding to Embodiment 1. For related descriptions of a feature thereof, refer to descriptions in Embodiment 1. Details are not described herein again.

Figure 16:
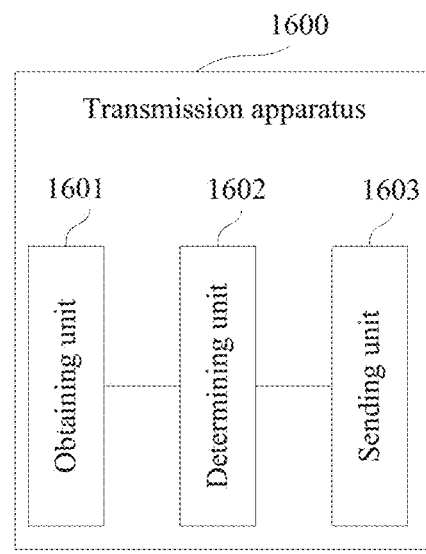
FIG. 16 is a structural diagram of a reference signal transmission apparatus according to an embodiment of this application.

FIG. 16 is a structural diagram of a reference signal transmission apparatus according to this embodiment of this application. The transmission apparatus 1600 includes: an obtaining unit 1601, a determining unit 1602, and a sending unit 1603.

The obtaining unit 1601 is configured to obtain a time domain resource parameter used to send a reference signal.

The determining unit 1602 is configured to determine, from a slot and based on the time domain resource parameter, information about a transmission resource used to transmit the reference signal, where the transmission resource information includes a symbol location of the transmission resource in the slot and/or a space domain resource on a symbol in the transmission resource.

The sending unit 1603 is configured to send the reference signal on the transmission resource.

Optionally, the reference signal includes an SRS.

Optionally, the space domain resource includes a beam direction of a beam used to transmit the reference signal, or a precoding parameter for use when the reference signal is transmitted by using a plurality of antennas.

Optionally, the time domain resource parameter includes a type of a slot used to send the reference signal and/or an index of a time domain resource for sending the reference signal.

Optionally, the type of the slot is determined based on a function of the slot and/or a quantity of transmitting resources and a quantity of receiving resources in the slot.

Optionally, the determining unit is further configured to determine, from the slot and based on the time domain resource parameter and a first parameter, the information about the transmission resource used to transmit the reference signal, where the first parameter includes any one of or a combination of more than one of a carrier identifier, a bandwidth part identifier, a cell identifier, a beam identifier, and a subcarrier spacing.

Optionally, the determining unit is further configured to: determine, based on a slot type of the slot, the symbol location, in the slot, of the transmission resource used to transmit the reference signal, where each slot type is associated with a symbol location that is of the reference signal in the slot and that corresponds to the slot type; or determine, based on a slot type of the slot, the symbol location, in the slot, of the transmission resource used to transmit the reference signal and a quantity of symbols, where each slot type is associated with a quantity of symbols and a symbol location that is of the reference signal in the slot and that corresponds to the slot type.

Optionally, the transmission resource includes at least one symbol. When the transmission resource includes a plurality of symbols, the plurality of symbols are consecutive symbols in time domain or nonconsecutive symbols in time domain.

Optionally, the determining unit is further configured to determine, from one slot or a plurality of consecutive slots and based on the time domain resource parameter, the information about the transmission resource used to transmit the reference signal.

Optionally, the determining unit is further configured to determine, from a transmission resource set of the slot and based on the time domain resource parameter, the information about the transmission resource used to transmit the reference signal, where the transmission resource set is predefined, or configured by using signaling.

Optionally, the transmission resource set includes M symbols in one or more slots, and a quantity of symbols included in the transmission resource is N, where M≥N.

Optionally, the determining unit is further configured to determine, from a transmission resource set of the slot and based on the time domain resource parameter and a first parameter, the information about the transmission resource used to transmit the reference signal, where the first parameter includes any one of or a combination of more than one of a carrier identifier, a bandwidth part identifier, a cell identifier, a beam identifier, and a subcarrier spacing.

Optionally, the first device has M antenna ports, the space domain resource on the symbol in the transmission resource includes an antenna port identifier, the time domain resource parameter includes an index of a time domain resource for sending the reference signal, and the determining unit is further configured to determine, from the slot and based on the index of the time domain resource for sending the reference signal, identifiers of K antenna ports used to transmit the reference signal, where K is a positive integer greater than 1, and the identifiers of the K antenna ports correspond to the K antenna ports in the M antenna ports.

Optionally, the determining unit is further configured to determine, from the slot and based on an offset parameter and the index of the time domain resource for sending the reference signal, the identifiers of the K antenna ports used to transmit the reference signal.

Optionally, the determining unit is further configured to determine, from the slot and based on the time domain resource parameter and a predefined mode, a beam direction of each symbol in the transmission resource used to transmit the reference signal.

Optionally, the transmission resource for transmitting the reference signal includes N symbols, where N is a positive integer greater than 1, at least two of the N symbols occupy a same frequency domain resource of the reference signal, and the reference signal is generated by multiplying an orthogonal sequence whose length is N by a reference signal sequence whose length is L.

Embodiment 7

This embodiment is an apparatus embodiment corresponding to Embodiment 2. For related descriptions of a feature thereof, refer to descriptions in Embodiment 2. Details are not described herein again.

Figure 17:
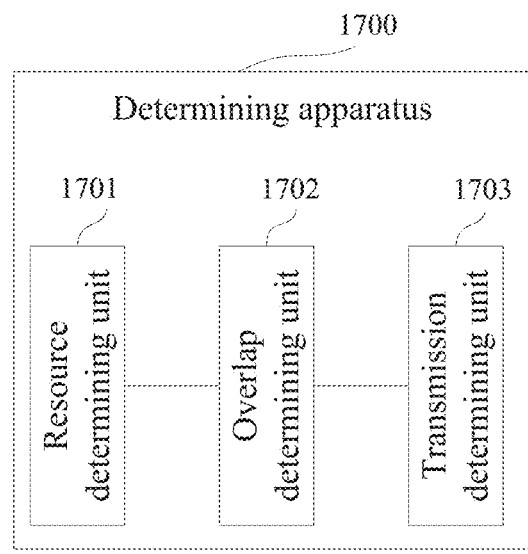
FIG. 17 is a structural diagram of an apparatus for determining a transmission resource of a reference signal according to an embodiment of this application.

FIG. 17 is a structural diagram of an apparatus for determining a transmission resource of a reference signal according to this embodiment of this application. The determining apparatus 1700 includes a resource determining unit 1701, an overlap determining unit 1702, and a transmission determining unit 1703.

The resource determining unit 1701 is configured to determine a first resource and a second resource, where the first resource is a transmission resource used to transmit a to-be-sent reference signal, and the second resource is a transmission resource used to transmit a to-be-sent message.

The overlap determining unit 1702 is configured to determine an overlapping portion, where the overlapping portion includes a time domain portion that is in the first resource and that overlaps with the second resource.

The transmission determining unit 1703 is configured to: determine, from the overlapping portion, a transmission resource used to transmit a part of the reference signal, or determine that all transmission resources in the overlapping portion are transmission resources not used to transmit the reference signal.

Optionally, a transmission resource in the first resource includes any one of or a combination of more than one of a time domain resource, a frequency domain resource, a code domain resource, and a space domain resource.

Optionally, a case, in which the first resource has a portion that overlaps with the second resource, includes any one of the following:

some symbols of the first resource overlap with some symbols of the second resource in terms of time domain locations; or all symbols of the first resource overlap with some symbols of the second resource in terms of time domain locations; or some symbols of the first resource overlap with all symbols of the second resource in terms of time domain locations; or all symbols of the first resource overlap with all symbols of the second resource in terms of time domain locations.

Optionally, the transmission determining unit is further configured to: determine, from the first resource, a transmission resource used to transmit a part of the reference signal, or determine that all the transmission resources in the overlapping portion are transmission resources not used to transmit the reference signal, or determine that all transmission resources in the first resource are transmission resources not used to transmit the reference signal.

Optionally, if some symbols of the first resource overlap with some symbols of the second resource in terms of time domain locations or if some symbols of the first resource overlap with all symbols of the second resource in terms of time domain locations, the transmission determining unit is triggered.

Optionally, the transmission determining unit is further configured to: determine, from the overlapping portion and based on indication information, a transmission resource used to transmit a part of the reference signal, or determine that all the transmission resources in the overlapping portion are transmission resources not used to transmit the reference signal, where the indication information is predefined, or configured by using signaling.

Optionally, the indication information is used to instruct the first device to determine, from the overlapping portion, a transmission resource used to transmit a part of the reference signal; or the indication information is used to instruct the first device to determine that all the transmission resources in the overlapping portion are transmission resources not used to transmit the reference signal; or the indication information is used to instruct the first device to determine that all the transmission resources in the first resource are transmission resources not used to transmit the reference signal.

Optionally, the transmission determining unit is further configured to: determine, from the overlapping portion and based on a quantity of symbols included in the overlapping portion, a transmission resource used to transmit a part of the reference signal, or determine that all the transmission resources in the overlapping portion are transmission resources not used to transmit the reference signal, or determine that all the transmission resources in the first resource are transmission resources not used to transmit the reference signal.

Optionally, the transmission determining unit is further configured to: if the quantity of symbols included in the overlapping portion is less than or equal to a preset quantity, determine, from the overlapping portion, a transmission resource used to transmit a part of the reference signal, or determine that all the transmission resources in the overlapping portion are transmission resources not used to transmit the reference signal; or if the quantity of symbols included in the overlapping portion is greater than the preset quantity, determine that all the transmission resources in the first resource are transmission resources not used to transmit the reference signal.

Optionally, the message includes one or more of a HARQ response message, SR information, beam failure request information, and the like.

Optionally, the transmission resource used to transmit a part of the reference signal is predefined, or configured by using signaling.

Optionally, the transmission determining unit is further configured to: determine, from the overlapping portion, some space domain resources used to transmit a part of the reference signal, or determine that all space domain resources in the overlapping portion are space domain resources not used to transmit the reference signal.

Optionally, the space domain resource includes a beam direction of a beam used to transmit the reference signal, or a precoding parameter for use when the reference signal is transmitted by using a plurality of antennas.

Optionally, in some space domain resources used to transmit a part of the reference signal, a beam direction that is unsent by the first device and that is of the reference signal located on a first symbol is the same as or different from a beam direction that is unsent by the first device and that is of the reference signal located on a second symbol, where the first symbol and the second symbol are symbols in the overlapping portion.

Optionally, in a partial space domain resource, all of which is used to transmit the reference signal, in the first resource, a beam direction that is unsent by the first device and that is of the reference signal located on a third symbol is the same as or different from a beam direction that is unsent by the first device and that is of the reference signal located on a fourth symbol, where the third symbol and the fourth symbol are symbols in the first resource.

Optionally, the apparatus further includes a sending unit, where the sending unit is configured to: send indication information to a base station, where the indication information is used to indicate the determined transmission resource used to transmit a part of the reference signal in the overlapping portion; or used to indicate that all the transmission resources in the overlapping portion are transmission resources not used to transmit the reference signal; or used to indicate that all the transmission resources in the first resource are transmission resources not used to transmit the reference signal.

Optionally, the sending unit is further configured to send, by using the first resource, a reference signal that is in the first resource and that is not located in the overlapping portion.

Optionally, when a plurality of reference signals are located in the overlapping portion, the transmission determining unit is further configured to: determine priorities of the plurality of reference signals located in the overlapping portion; and determine, from the overlapping portion, a transmission resource used to transmit some reference signals whose priorities are relatively high in the plurality of reference signals, or determine that all the transmission resources in the overlapping portion are transmission resources not used to transmit at least one reference signal whose priority is relatively low in the plurality of reference signals.

Optionally, a priority of a reference signal is determined based on a type of the reference signal.

Optionally, a priority of an aperiodic reference signal is higher than that of a semi-persistent reference signal; and a priority of a semi-persistent reference signal is higher than that of a periodic reference signal.

Optionally, a plurality of reference signals in the first resource occupy M parallel frequency domain resources, and the transmission determining unit is further configured to: determine, from N parallel frequency domain resources located in the overlapping portion, a frequency domain resource used to transmit a part of the reference signal, or determine that the N parallel frequency domain resources located in the overlapping portion are frequency domain resources not used to transmit the reference signal, where the N frequency domain resources are a subset of the M parallel frequency domain resources.

Optionally, the frequency domain resource includes a carrier, or a bandwidth part, or a subband.

Optionally, in the N parallel frequency domain resources, each frequency domain resource comes from a same configured reference signal, or comes from reference signals in a same frequency hopping mode.

Optionally, at least one of the N parallel frequency domain resources is determined based on a first parameter, where the first parameter includes any one of or a combination of more than one of the following parameters:

indication information of a time domain or frequency domain resource of downlink control information used for scheduling the first device:

a bandwidth part identifier;

a carrier identifier;

an identifier of the first device:

an identifier of a cell in which the first device is located;

a space domain resource identifier:

an identifier of a slot in which the first resource is located; and an identifier of a reference signal.

Optionally, a plurality of reference signals in the first resource occupy M parallel frequency domain resources, and the transmission determining unit is further configured to: determine that all frequency domain resources in the overlapping portion are frequency domain resources not used to transmit a specific type of reference signal, where the specific type of reference signal includes a periodic reference signal or a semi-persistent reference signal.

Optionally, the transmission determining unit is further configured to: obtain a priority of a reference signal in the overlapping portion and a priority of a first message, where the first message is located in a time domain portion that is in the second resource and that overlaps with the first resource; and if the priority of the reference signal in the overlapping portion is lower than the priority of the first message, determine, from the overlapping portion, a transmission resource used to transmit a part of the reference signal, or determine that all the transmission resources in the overlapping portion are transmission resources not used to transmit the reference signal.

Optionally, the first message includes an urgent message and a non-urgent message, where the urgent message includes a HARQ response message, SR information, or beam failure request information; and the non-urgent message is a message other than the urgent message; and the first device determines whether the priority of the reference signal in the overlapping portion is higher or lower than the priority of the first message in the following manner:

a priority of the urgent message is higher than the priority of the reference signal in the overlapping portion; and when the reference signal in the overlapping portion is an aperiodic reference signal, the priority of the reference signal in the overlapping portion is higher than a priority of a non-urgent message; or when the reference signal in the overlapping portion is a semi-persistent reference signal, the priority of the reference signal in the overlapping portion is higher than a priority of a non-urgent message.

Optionally, the type of the reference signal includes: a periodic reference signal, an aperiodic reference signal, a semi-persistent reference signal, or a reference signal used to capture channel state information.

Optionally, if transmit power for transmitting a symbol in the overlapping portion exceeds predefined power, the transmission determining unit is triggered.

Embodiment 8

This embodiment is an apparatus embodiment corresponding to Embodiment 3. For related descriptions of a feature thereof, refer to descriptions in Embodiment 3. Details are not described herein again.

Figure 18:
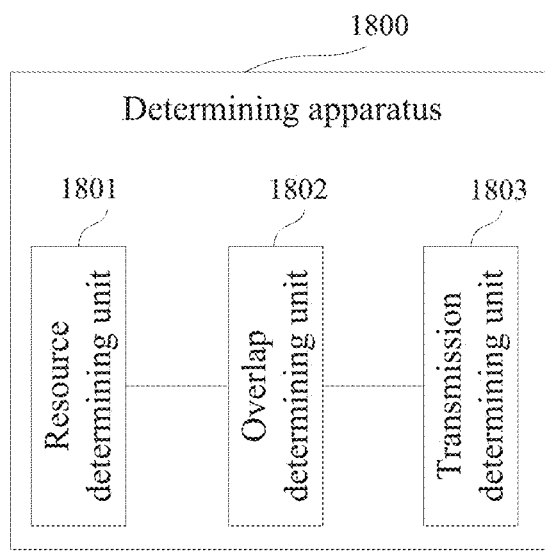
FIG. 18 is a structural diagram of an apparatus for determining a transmission resource of a message according to an embodiment of this application.

FIG. 18 is a structural diagram of an apparatus for determining a transmission resource of a message according to this embodiment of this application. The determining apparatus 1800 includes a resource determining unit 1801, an overlap determining unit 1802, and a transmission determining unit 1803.

The resource determining unit 1801 is configured to determine a first resource and a second resource, where the first resource is a transmission resource used to transmit a to-be-sent reference signal, and the second resource is a transmission resource used to transmit a to-be-sent message.

The overlap determining unit 1802 is configured to determine an overlapping portion, where the overlapping portion includes a time domain portion that is in the second resource and that overlaps with the first resource.

The transmission determining unit 1803 is configured to: determine, from the overlapping portion, a transmission resource used to transmit a part of the message, or determine that all transmission resources in the overlapping portion are transmission resources not used to transmit the message.

Optionally, the transmission determining unit is further configured to: obtain a priority of a reference signal and a priority of a message in the overlapping portion, where the reference signal is located in a time domain portion that is in the first resource and that overlaps with the second resource; and if the priority of the reference signal is higher than the priority of the message, determine, from the overlapping portion, a transmission resource used to transmit a part of the message, or determine that all the transmission resources in the overlapping portion are transmission resources not used to transmit the message.

Optionally, the message includes an urgent message and a non-urgent message, where the urgent message includes a hybrid automatic repeat request HARQ response message, scheduling request SR information, or beam failure request information; and the non-urgent message is a message other than the urgent message; and the first device determines whether the priority of the reference signal is higher or lower than the priority of the message in the following manner:

a priority of the urgent message is higher than the priority of the reference signal; and when the reference signal is an aperiodic reference signal, the priority of the reference signal is higher than a priority of a non-urgent message; or when the reference signal is a semi-persistent reference signal, the priority of the reference signal is higher than a priority of a non-urgent message.

Optionally, if the message includes a demodulation reference signal, the transmission determining unit is configured to determine that the priority of the reference signal is lower than the priority of the message.

Optionally, the message and the reference signal are located in a same carrier, or located in different bandwidth parts of a same carrier, or located in a same bandwidth part of a same carrier; and the reference signal is located in a time domain portion that is in the first resource and that overlaps with the second resource.

Embodiment 9

This embodiment is an apparatus embodiment corresponding to Embodiment 4. For related descriptions of a feature thereof, refer to descriptions in Embodiment 4. Details are not described herein again.

Figure 19:
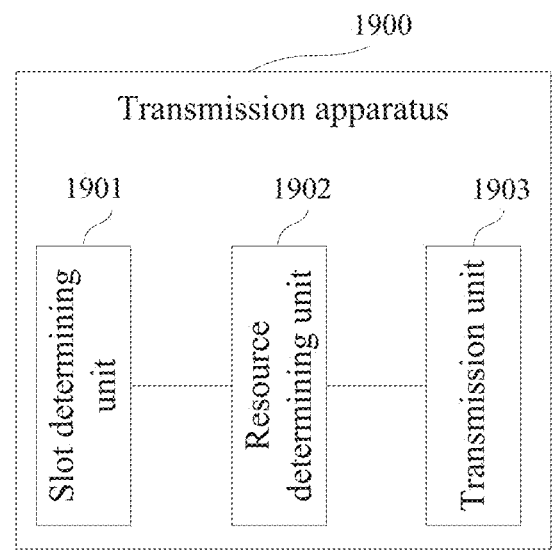
FIG. 19 is a structural diagram of a reference signal transmission apparatus according to an embodiment of this application.

FIG. 19 is a structural diagram of a reference signal transmission apparatus according to this embodiment of this application. The transmission apparatus 1900 includes: a slot determining unit 1901, a resource determining unit 1902, and a transmission unit 1903.

The slot determining unit 1901 is configured to determine a slot used to send a reference signal.

If it is determined that the slot is not suitable for transmitting the reference signal or the slot does not have a transmission resource used to transmit the reference signal, the resource determining unit 1902 is configured to re-determine a transmission resource used to transmit the reference signal.

The transmission unit 1903 is configured to transmit the reference signal on the transmission resource used to transmit the reference signal.

Optionally, the slot determining unit is further configured to determine a type of the slot used to send the reference signal, where the type of the slot is determined based on a function of the slot and/or a quantity of transmitting resources and a quantity of receiving resources in the slot.

Optionally, the resource determining unit is further configured to add the transmission resource used to transmit the reference signal in the slot.

Optionally, if the type of the slot is not suitable for transmitting the reference signal, the resource determining unit is further configured to: add the transmission resource used to transmit the reference signal, and set a switching gap in a remaining transmission resource of the slot in the slot.

Optionally, the resource determining unit is further configured to: switch from the slot to a slot suitable for transmitting the reference signal; and determine, from the slot, the transmission resource used to transmit the reference signal.

Optionally, if the slot has a transmission resource used to transmit control information, the transmission resource used to transmit the reference signal and the transmission resource used to transmit the control information are multiplexed in a time domain adjacency manner.

Optionally, if there are a plurality of parallel frequency domain resources in the slot and the frequency domain resource includes a bandwidth part or a carrier, that the slot does not have a transmission resource used to transmit the reference signal includes: a first frequency domain resource does not have the transmission resource used to transmit the reference signal, where the first frequency domain resource is one of the plurality of frequency domain resources; and the resource determining unit is further configured to: determine, from a second frequency domain resource, the transmission resource used to transmit the reference signal, where the second frequency domain resource is one of the plurality of frequency domain resources; or if control information is located in the first frequency domain resource, map the control information to the second frequency domain resource, and determine, from the first frequency domain resource, the transmission resource used to transmit the reference signal.

Optionally, the transmission unit is further configured to send indication information to a base station, where the indication information is used to indicate the transmission resource that is re-determined by the first device and that is used to transmit the reference signal.

Optionally, the indication information includes: a parameter of a sequence used to transmit the reference signal, or a location of a time-frequency resource used to transmit the reference signal.

Optionally, the reference signal includes any one of the following: a sounding reference signal, a demodulation reference signal, a phase tracking reference signal, a channel state information-reference signal, a random access reference signal, or a positioning reference signal.

Embodiment 10

This embodiment is an apparatus embodiment corresponding to Embodiment 5. For related descriptions of a feature thereof, refer to descriptions in Embodiment 5. Details are not described herein again.

Figure 20:
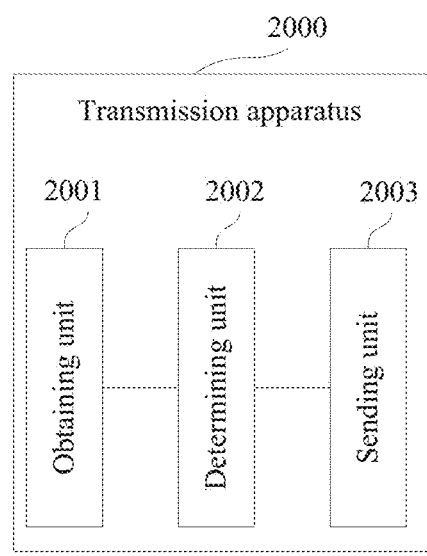
FIG. 20 is a structural diagram of a reference signal transmission apparatus according to an embodiment of this application.

FIG. 20 is a structural diagram of a reference signal transmission apparatus according to this embodiment of this application. The transmission apparatus 2000 includes: an obtaining unit 2001, a determining unit 2002, and a sending unit 2003.

The obtaining unit 2001 is configured to obtain parameter configuration information of a first reference signal and parameter configuration information of a second reference signal.

The determining unit 2002 is configured to determine association configuration information, where the association configuration information is used to determine an association relationship between the parameter configuration information of the first reference signal and the parameter configuration information of the second reference signal.

The sending unit 2003 is configured to send the first reference signal, the second reference signal, and the association configuration information.

Optionally, the parameter configuration information of the first reference signal includes at least one of the following: a quantity N of symbols used to transmit the first reference signal, time domain locations of the N symbols of the reference signal, preceding values or beam directions used for the N time domain symbols, locations of the N time domain symbols in frequency domain, and a parameter for generating a sequence to be used for the N time domain symbols, where N is a positive integer.

Optionally, the parameter for generating the sequence to be used for the N time domain symbols includes: a root sequence number, a cyclic shift value, and an orthogonal sequence index.

Optionally, the association configuration information includes any one of or a combination of more than one of the following: indexes of time domain resources for transmitting the first reference signal and the second reference signal, a beam identifier, a subcarrier spacing identifier, a reference signal source identifier, an identifier indicating transmitter, a carrier identifier, a bandwidth part identifier, a cell identifier, and an index of a time domain or frequency domain resource in which control signaling for scheduling a reference signal is located.

It can be clearly understood by persons skilled in the art that, for the purpose of convenient and brief description, for detailed working processes of the foregoing system, apparatus, and unit, reference may be made to corresponding processes in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division, and there may be another division manner in actual implementation. For example, a plurality of units or components may be combined or may be integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts shown as units may or may not be physical units, and may be located in one position, or may be distributed on a plurality of network units. Some or all of the units may be selected depending on actual needs, to achieve the objectives of the solutions of the embodiments.

In addition, functional units in the embodiments of this application may be integrated into one processing unit, or each unit may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

The foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a transmission resource of a reference signal, wherein the method is applied to a terminal, and the method comprises:
    determining at least one symbol configured to transmit a sounding reference signal (SRS);
    determine at least one symbol configured to transmit a message carried on a physical uplink control channel (PUCCH); and
    determining that none of at least one symbol in an overlapping portion is used to transmit the SRS, wherein the at least one symbol in the overlapping portion belongs to both of the at least one symbol configured to transmit the SRS and the at least one symbol configured to transmit the message.

2. An apparatus for determining a transmission resource of a reference signal, wherein the apparatus comprises:
    a non-transitory memory storage comprising instructions; and
    one or more hardware processors in communication with the non-transitory memory storage, wherein the one or more hardware processors execute the instructions to:
        determine at least one symbol configured to transmit a sounding reference signal (SRS);
        determine at least one symbol configured to transmit a message carried on a physical uplink control channel (PUCCH); and
        determine that none of at least one symbol in an overlapping portion is used to transmit the SRS, wherein the at least one symbol in the overlapping portion belongs to both of the at least one symbol configured to transmit the SRS and the at least one symbol configured to transmit the message.

3. The method according to claim 1, further comprising:
    in response to the at least one symbol in the overlapping portion being a part of the at least one symbol configured to transmit the SRS, transmitting the SRS in one or more of the at least one symbol configured to transmit the SRS, other than the at least one symbol in the overlapping portion.

4. The method according to claim 3, wherein transmitting the SRS in the one or more symbols comprises:
    transmitting a part of the SRS in the one or more symbols, wherein the part of the SRS is determined to be transmit in the one or more symbols when determining the at least one symbol configured to transmit the SRS.

5. The method according to claim 1, wherein determining that none of the at least one symbol in the overlapping portion are used to transmit the SRS comprises:
skipping sending a part of the SRS, wherein the part of the SRS is determined to be transmit in the at least one symbol in the overlapping portion when determining the at least one symbol configured to transmit the SRS.

6. The method according to claim 1, wherein determining that none of the at least one symbol in the overlapping portion are used to transmit the SRS comprises:
in response to the message is a hybrid automatic repeat request (HARQ) response message or scheduling request (SR) information, determine that the priority of the SRS is lower than the priority of the message; and
in response to a priority of the SRS being lower than a priority of the message, determining that none of the at least one symbol in the overlapping portion are used to transmit the SRS.

7. The method according claim 1, wherein the at least one symbol configured to transmit the SRS is consecutive, and the at least one symbol configured to transmit the message is consecutive.

8. The apparatus according to claim 2, wherein the one or more hardware processors execute the instructions to:
in response to the at least one symbol in the overlapping portion being a part of the at least one symbol configured to transmit the SRS, transmit the SRS in one or more of the at least one symbol configured to transmit the SRS, other than the at least one symbol in the overlapping portion.

9. The apparatus according to claim 8, wherein the one or more hardware processors execute the instructions to:
transmit a part of the SRS in the one or more symbols, wherein the part of the SRS is determined to be transmit in the one or more symbols when determining the at least one symbol configured to transmit the SRS.

10. The apparatus according to claim 2, wherein the one or more hardware processors execute the instructions to:
skip sending a part of the SRS, wherein the part of the SRS is determined to be transmit in the at least one symbol in the overlapping portion when determining the at least one symbol configured to transmit the SRS.

11. The apparatus according to claim 2, wherein the one or more hardware processors execute the instructions to:
in response to the message is a hybrid automatic repeat request (HARQ) response message or scheduling request (SR) information, determine that the priority of the SRS is lower than the priority of the message; and
in response to a priority of the SRS being lower than a priority of the message, determine that none of the at least one symbol in the overlapping portion are used to transmit the SRS.

12. The apparatus according claim 2, wherein the at least one symbol configured to transmit the SRS is consecutive, and the at least one symbol configured to transmit the message is consecutive.

13. A method for determining a receiving resource of a reference signal, wherein the method is applied to a base station, and the method comprises:
determining at least one symbol configured to receive a sounding reference signal (SRS);
determine at least one symbol configured to receive a message carried on a physical uplink control channel (PUCCH); and
determining that none of at least one symbol in an overlapping portion is used to receive the SRS, wherein the at least one symbol in the overlapping portion belongs to both of the at least one symbol configured to receive the SRS and the at least one symbol configured to receive the message.

14. The method according to claim 13, further comprising:
in response to the at least one symbol in the overlapping portion being a part of the at least one symbol configured to receive the SRS, receiving the SRS in one or more of the at least one symbol configured to receive the SRS, other than the at least one symbol in the overlapping portion.

15. The method according to claims 13, wherein determining that none of the at least one symbol in the overlapping portion are used to receive the SRS comprises:
in response to the message is a hybrid automatic repeat request (HARQ) response message or scheduling request (SR) information, determine that the priority of the SRS is lower than the priority of the message; and
in response to a priority of the SRS being lower than a priority of the message, determine that none of the at least one symbol in the overlapping portion are used to receive the SRS.

16. The method according claim 13, wherein the at least one symbol configured to receive the SRS is consecutive, and the at least one symbol configured to receive the message is consecutive.

17. An apparatus for determining a receiving resource of a reference signal, wherein the apparatus comprises:
a non-transitory memory storage comprising instructions; and
one or more hardware processors in communication with the non-transitory memory storage, wherein the one or more hardware processors execute the instructions to:
determine at least one symbol configured to receive a sounding reference signal (SRS);
determine at least one symbol configured to receive a message carried on a physical uplink control channel (PUCCH); and
determine that none of at least one symbol in an overlapping portion is used to receive the SRS, wherein the at least one symbol in the overlapping portion belongs to both of the at least one symbol configured to receive the SRS and the at least one symbol configured to receive the message.

18. The apparatus according to claim 17, wherein the one or more hardware processors execute the instructions to:
in response to the at least one symbol in the overlapping portion being a part of the at least one symbol configured to receive the SRS, receive the SRS in one or more of the at least one symbol configured to receive the SRS, other than the at least one symbol in the overlapping portion.

19. The apparatus according to claims 17, wherein the one or more hardware processors execute the instructions to:
in response to the message is a hybrid automatic repeat request (HARQ) response message or scheduling request (SR) information, determine that the priority of the SRS is lower than the priority of the message; and
in response to a priority of the SRS being lower than a priority of the message, determine that none of the at least one symbol in the overlapping portion are used to receive the SRS.

20. The apparatus according claim 17, wherein the at least one symbol configured to receive the SRS is consecutive, and the at least one symbol configured to receive the message is consecutive.

* * * * *